US011072455B2

(12) United States Patent
McMahon et al.

(10) Patent No.: US 11,072,455 B2
(45) Date of Patent: Jul. 27, 2021

(54) PROCESS FOR FORMING PLASTIC CORRUGATED CONTAINER AND INTERMEDIARY BLANK

(71) Applicant: ORBIS Corporation, Oconomowoc, WI (US)

(72) Inventors: William F. McMahon, Hartford, WI (US); Donald J. Balazs, Oconomowoc, WI (US)

(73) Assignee: ORBIS Corporation, Oconomowoc, WI (US)

( * ) Notice: Subject to any disclaimer, the term of this patent is extended or adjusted under 35 U.S.C. 154(b) by 684 days.

(21) Appl. No.: 14/580,832

(22) Filed: Dec. 23, 2014

(65) Prior Publication Data

US 2015/0174850 A1 Jun. 25, 2015

Related U.S. Application Data

(60) Provisional application No. 61/920,570, filed on Dec. 24, 2013.

(51) Int. Cl.
*B31B 120/30* (2017.01)
*B65D 5/42* (2006.01)
(Continued)

(52) U.S. Cl.
CPC .......... *B65D 5/4266* (2013.01); *B29C 53/063* (2013.01); *B29C 67/0044* (2013.01);
(Continued)

(58) Field of Classification Search
CPC .... B65D 5/4266; B65D 5/3621; B65D 11/16; B65D 11/186; B65D 11/24; B29C 53/063;
(Continued)

(56) References Cited

U.S. PATENT DOCUMENTS 1,101,927 A 6/1914 Hawkins et al.
1,733,566 A 10/1929 Weaver
(Continued)

FOREIGN PATENT DOCUMENTS

DE 9110957 U1 12/1991
DE 102010041663 A1 3/2012
(Continued)

OTHER PUBLICATIONS

European Patent Office, International Search Report for PCT/US2014/071926 dated Jun. 30, 2015 (6 pages).
(Continued)

*Primary Examiner* — Sameh Tawfik
(74) *Attorney, Agent, or Firm* — Greensfelder, Hemker & Gale, P.C.; Richard C. Himelhoch

(57) ABSTRACT

A corrugated plastic box and a method for manufacturing a corrugated plastic box from a blank are provided. The method includes the steps of forming rounded edge seals on the perimeter edges of the blank, pre-sealing portions of the blank to form a plurality of areas in which major and minor flap slots and a glue tab are desired, ultrasonically scoring the blank to form a plurality of flap score lines, and cutting the blank through the plurality of pre-sealed flap slots and glue tab, leaving a sealed edge.

21 Claims, 31 Drawing Sheets

(51) Int. Cl.

| | | |
|---|---|---|
| *B29C 67/00* | (2017.01) | |
| *B29C 53/06* | (2006.01) | |
| *B65D 5/36* | (2006.01) | |
| *B65D 6/10* | (2006.01) | |
| *B65D 6/18* | (2006.01) | |
| *B65D 6/38* | (2006.01) | |
| B29L 31/60 | (2006.01) | |
| B29L 31/00 | (2006.01) | |
| B29C 35/02 | (2006.01) | |
| B31B 50/25 | (2017.01) | |
| B31B 110/35 | (2017.01) | |
| B31B 50/20 | (2017.01) | |
| B31B 50/64 | (2017.01) | |
| B31B 100/00 | (2017.01) | |
| B31B 50/22 | (2017.01) | |
| B31B 50/62 | (2017.01) | |

(52) U.S. Cl.
CPC ............ *B65D 5/3621* (2013.01); *B65D 11/16* (2013.01); *B65D 11/186* (2013.01); *B65D 11/24* (2013.01); *B29C 35/0261* (2013.01); *B29L 2031/60* (2013.01); *B29L 2031/7162* (2013.01); *B31B 50/20* (2017.08); *B31B 50/22* (2017.08); *B31B 50/256* (2017.08); *B31B 50/624* (2017.08); *B31B 50/64* (2017.08); *B31B 2100/00* (2017.08); *B31B 2100/0022* (2017.08); *B31B 2110/35* (2017.08); *B31B 2120/30* (2017.08)

(58) Field of Classification Search
CPC ... B29C 67/0044; B29C 35/0261; B31B 1/00; B31B 1/25; B31B 1/64; B31B 2201/147; B31B 2201/148; B31B 2201/257; B31B 2201/6017; B31B 2201/6026; B31B 2203/003; B31B 2203/082
USPC .......................................................... 493/59
See application file for complete search history.

(56) References Cited

U.S. PATENT DOCUMENTS

| | | | |
|---|---|---|---|
| 2,533,773 A | 12/1950 | De La Foret | |
| 2,751,136 A | 6/1956 | Moore | |
| 3,199,763 A | 8/1965 | Anderson | |
| 3,203,288 A | 8/1965 | Blumer | |
| 3,406,052 A * | 10/1968 | Peters | B29C 65/106 156/198 |
| 3,414,184 A | 12/1968 | Loheed | |
| 3,562,041 A * | 2/1971 | Robertson | B29C 66/73921 156/73.1 |
| 3,611,884 A | 10/1971 | Hottendort | |
| 3,687,170 A | 8/1972 | Malone et al. | |
| 3,727,625 A | 4/1973 | Nagumo et al. | |
| 3,727,826 A | 4/1973 | Shepherd | |
| 3,768,724 A * | 10/1973 | Hill | B31D 5/0073 206/523 |
| 3,796,307 A | 3/1974 | McKinney | |
| 3,883,065 A | 5/1975 | Presnick | |
| 3,884,132 A * | 5/1975 | Snodgrass | B23P 15/406 428/329 |
| 3,907,193 A | 9/1975 | Heller | |
| 3,929,536 A * | 12/1975 | Maughan | B29C 63/02 156/213 |
| 3,973,721 A | 8/1976 | Nakane | |
| 3,977,310 A | 8/1976 | Keck | |
| 3,981,213 A | 9/1976 | Lopman | |
| 4,011,798 A * | 3/1977 | Bambara | B29C 65/18 493/240 |
| 4,027,058 A | 5/1977 | Wootten | |
| 4,090,903 A * | 5/1978 | Matsui | B29C 53/066 156/211 |
| 4,106,623 A | 8/1978 | Carroll et al. | |
| 4,121,754 A | 10/1978 | Hackenberg | |
| 4,239,150 A | 12/1980 | Schadowski et al. | |
| 4,267,223 A | 5/1981 | Swartz | |
| 4,313,547 A | 2/1982 | Osborne | |
| 4,348,449 A | 9/1982 | Seufert | |
| 4,356,053 A * | 10/1982 | LoMaglio | B29C 67/0044 156/107 |
| 4,358,498 A | 11/1982 | Chavannes | |
| 4,415,515 A | 11/1983 | Rosenberg | |
| 4,441,948 A * | 4/1984 | Gillard | B31C 1/00 156/189 |
| 4,477,013 A | 10/1984 | Herrin | |
| 4,477,522 A * | 10/1984 | Sheehan | B29C 70/10 428/359 |
| 4,482,417 A | 11/1984 | Hulber et al. | |
| 4,507,348 A | 3/1985 | Nagata et al. | |
| 4,515,648 A | 5/1985 | Kolbe et al. | |
| 4,517,790 A * | 5/1985 | Kreager | B29C 65/7443 156/353 |
| 4,535,929 A | 8/1985 | Sherman, II et al. | |
| 4,559,259 A | 12/1985 | Cetrelli | |
| 4,596,541 A * | 6/1986 | Ward, Sr. | B26D 3/085 493/354 |
| 4,601,407 A | 7/1986 | Gillard | |
| 4,604,083 A | 8/1986 | Barny et al. | |
| 4,605,454 A * | 8/1986 | Sayovitz | B29C 65/086 156/308.8 |
| 4,655,389 A | 4/1987 | Marsh | |
| 4,767,393 A | 8/1988 | Smith | |
| 4,784,269 A * | 11/1988 | Griffith | B65D 81/03 206/453 |
| 4,865,201 A | 9/1989 | Liebel | |
| 4,906,510 A | 3/1990 | Todor, Jr. et al. | |
| 4,938,413 A | 7/1990 | Wolfe | |
| 4,946,430 A | 8/1990 | Kohmann | |
| 4,948,039 A | 8/1990 | Amatangelo | |
| 4,960,207 A | 10/1990 | Tabler et al. | |
| 5,012,930 A | 5/1991 | Hansen | |
| 5,021,042 A * | 6/1991 | Resnick | B26F 1/44 493/404 |
| 5,054,265 A | 10/1991 | Perigo et al. | |
| 5,114,034 A | 5/1992 | Miller et al. | |
| 5,158,525 A | 10/1992 | Nikkel | |
| 5,163,609 A | 11/1992 | Muise, Jr. | |
| 5,183,672 A | 2/1993 | Fetterhoff et al. | |
| 5,190,213 A | 3/1993 | Horwitz | |
| 5,202,065 A | 4/1993 | Lenander et al. | |
| 5,232,149 A | 8/1993 | Stoll | |
| 5,255,842 A | 10/1993 | Rosen | |
| 5,268,138 A | 12/1993 | Fetterhoff et al. | |
| 5,304,056 A | 4/1994 | Fetterhoff | |
| 5,340,632 A * | 8/1994 | Chappuis | B29C 49/0047 156/497 |
| 5,351,846 A | 10/1994 | Carter | |
| 5,356,696 A | 10/1994 | Fetterhoff | |
| 5,384,002 A | 1/1995 | Leatherman et al. | |
| 5,466,211 A * | 11/1995 | Komarek | B26D 7/27 156/257 |
| 5,497,939 A | 3/1996 | Heiskell et al. | |
| 5,501,758 A * | 3/1996 | Nitardy | B29C 53/06 156/198 |
| 5,503,324 A | 4/1996 | Bacchetti et al. | |
| 5,533,956 A | 7/1996 | Komarek et al. | |
| 5,564,623 A | 10/1996 | Kiley | |
| 5,642,854 A | 7/1997 | Hatton | |
| 5,658,644 A | 8/1997 | Ho et al. | |
| 5,681,422 A | 10/1997 | Marschke | |
| 5,733,411 A | 3/1998 | Belt | |
| 5,765,688 A * | 6/1998 | Bertram | B29C 44/182 206/320 |
| 5,873,807 A * | 2/1999 | Lauderbaugh | B31B 50/00 493/403 |
| 5,881,902 A | 3/1999 | Ackermann | |
| 5,887,782 A | 3/1999 | Mueller | |
| 5,908,135 A | 6/1999 | Bradford et al. | |

(56) References Cited

U.S. PATENT DOCUMENTS

| | | | |
|---|---|---|---|
| 5,913,766 A | 6/1999 | Reed et al. | |
| 5,924,627 A | 7/1999 | Wilder et al. | |
| 5,965,238 A | 10/1999 | Saitoh et al. | |
| 6,007,470 A * | 12/1999 | Komarek | B26D 7/27 |
| | | | 493/396 |
| 6,039,101 A | 3/2000 | MacKinnon | |
| 6,056,840 A * | 5/2000 | Mills | B29C 53/063 |
| | | | 156/217 |
| 6,071,225 A | 6/2000 | Kucharski | |
| 6,102,279 A | 8/2000 | Dowd | |
| 6,102,280 A | 8/2000 | Dowd | |
| 6,120,629 A * | 9/2000 | Shannon | B29C 59/007 |
| | | | 156/580.2 |
| 6,138,903 A | 10/2000 | Baker | |
| 6,159,137 A | 12/2000 | Lee et al. | |
| 6,203,482 B1 | 3/2001 | Sandford | |
| 6,257,484 B1 | 7/2001 | Dowd | |
| 6,338,234 B1 * | 1/2002 | Muise | B32B 27/32 |
| | | | 493/110 |
| 6,349,876 B1 | 2/2002 | Dowd | |
| 6,450,398 B1 | 9/2002 | Muise et al. | |
| 6,572,519 B1 | 6/2003 | Harris | |
| 6,592,711 B1 * | 7/2003 | Kubik | B06B 3/00 |
| | | | 156/379.6 |
| 6,655,434 B2 | 12/2003 | Danko | |
| 6,676,010 B1 | 1/2004 | Roseth et al. | |
| 6,689,033 B2 | 2/2004 | Plemons et al. | |
| 6,705,515 B2 | 3/2004 | Dowd | |
| 6,719,191 B1 | 4/2004 | Christensen et al. | |
| 6,759,114 B2 | 7/2004 | Wu et al. | |
| 6,761,307 B2 | 7/2004 | Matsuoka | |
| 6,769,548 B2 * | 8/2004 | Morell | B65D 5/5064 |
| | | | 206/454 |
| 6,902,103 B2 | 6/2005 | Machery | |
| 6,926,192 B1 | 8/2005 | Dowd | |
| 6,938,818 B2 | 9/2005 | Moorman et al. | |
| 6,994,662 B2 | 2/2006 | Jornborn et al. | |
| 7,025,841 B2 * | 4/2006 | Owen | B29C 65/086 |
| | | | 156/290 |
| 7,028,834 B2 | 4/2006 | Karpel | |
| 7,069,856 B2 * | 7/2006 | Hartka | B31B 1/00 |
| | | | 101/481 |
| 7,326,168 B2 | 2/2008 | Kocherga et al. | |
| 7,384,497 B2 * | 6/2008 | Christensen | B29C 63/0091 |
| | | | 156/272.2 |
| D608,634 S | 1/2010 | Riedi | |
| 7,640,662 B2 * | 1/2010 | Haglid | F24F 5/0035 |
| | | | 29/890.03 |
| 7,670,275 B2 | 3/2010 | Schaack | |
| 7,682,300 B2 | 3/2010 | Graham et al. | |
| 7,726,480 B2 | 6/2010 | Nazari | |
| 7,870,992 B2 | 1/2011 | Schille et al. | |
| 7,886,503 B2 | 2/2011 | Chase et al. | |
| 7,951,252 B2 | 5/2011 | Danko | |
| 8,418,912 B1 | 4/2013 | Goodrich | |
| 8,662,133 B2 | 3/2014 | Ninomiya et al. | |
| 8,662,378 B2 | 3/2014 | Mehta | |
| 8,864,017 B2 | 10/2014 | McMahon | |
| 9,126,711 B2 * | 9/2015 | Hermosillo | B65D 5/003 |
| 9,302,806 B2 * | 4/2016 | Perkins | B65D 5/12 |
| 9,630,739 B2 | 4/2017 | McMahon et al. | |
| 10,199,811 B2 | 2/2019 | Chu et al. | |
| 10,392,153 B2 | 8/2019 | Mehta | |
| 10,625,916 B2 | 4/2020 | Balazs | |
| 2001/0022211 A1 * | 9/2001 | Walsh | B32B 37/12 |
| | | | 156/226 |
| 2001/0027992 A1 * | 10/2001 | Strong | B65D 11/1853 |
| | | | 229/117.01 |
| 2001/0046584 A1 | 11/2001 | Danko | |
| 2002/0011513 A1 | 1/2002 | Dowd | |
| 2002/0026742 A1 * | 3/2002 | Washington | A01M 31/025 |
| | | | 43/1 |
| 2002/0125594 A1 | 9/2002 | Sung et al. | |
| 2003/0010817 A1 * | 1/2003 | Lingle | B31B 19/00 |
| | | | 229/406 |
| 2003/0102361 A1 * | 6/2003 | Terashima | B65D 5/0227 |
| | | | 229/5.84 |
| 2003/0127773 A1 | 7/2003 | Feistel et al. | |
| 2003/0215613 A1 | 11/2003 | Jan et al. | |
| 2003/0235660 A1 | 12/2003 | Blanchard | |
| 2004/0222542 A1 | 11/2004 | Jan et al. | |
| 2005/0067084 A1 | 3/2005 | Kagan et al. | |
| 2005/0150244 A1 * | 7/2005 | Hillmann | B65D 5/566 |
| | | | 62/371 |
| 2005/0202215 A1 | 9/2005 | Temple, II et al. | |
| 2005/0209076 A1 * | 9/2005 | Boutron | B26D 3/085 |
| | | | 493/59 |
| 2006/0089071 A1 | 4/2006 | Leidig et al. | |
| 2006/0169757 A1 * | 8/2006 | McDowell | B65D 5/10 |
| | | | 229/122.33 |
| 2007/0069428 A1 * | 3/2007 | Pfaff | B31F 1/10 |
| | | | 264/442 |
| 2007/0228129 A1 | 10/2007 | Habeger, Jr. et al. | |
| 2007/0241900 A1 * | 10/2007 | Sasazaki | B65B 61/06 |
| | | | 340/572.1 |
| 2007/0296890 A1 | 12/2007 | Mizushima et al. | |
| 2008/0003869 A1 | 1/2008 | Wu et al. | |
| 2008/0003870 A1 | 1/2008 | Wu et al. | |
| 2008/0247682 A1 * | 10/2008 | Murray | B65B 3/02 |
| | | | 383/104 |
| 2009/0011173 A1 | 1/2009 | Thiagarajan | |
| 2009/0280973 A1 | 11/2009 | Graham et al. | |
| 2010/0078466 A1 | 4/2010 | Stack, Jr. et al. | |
| 2010/0105534 A1 | 4/2010 | Nazari | |
| 2010/0147840 A1 | 6/2010 | Dowd | |
| 2011/0069911 A1 | 3/2011 | Ackerman et al. | |
| 2011/0101081 A1 | 5/2011 | Dowd et al. | |
| 2011/0303740 A1 | 12/2011 | Schuld | |
| 2012/0118880 A1 * | 5/2012 | Wnek | B31B 1/00 |
| | | | 219/725 |
| 2013/0048704 A1 * | 2/2013 | Lewis | B65D 5/0015 |
| | | | 229/190 |
| 2013/0055407 A1 | 4/2013 | McMahon | |
| 2013/0092726 A1 * | 4/2013 | McMahon | B65D 5/4266 |
| | | | 229/126 |
| 2014/0231496 A1 | 8/2014 | McMahon | |
| 2014/0231497 A1 | 8/2014 | McMahon | |
| 2014/0367458 A1 | 12/2014 | Smith | |
| 2014/0367459 A1 | 12/2014 | Smith | |
| 2015/0174849 A1 | 6/2015 | McMahon et al. | |
| 2015/0175297 A1 | 6/2015 | McMahon et al. | |
| 2019/0300210 A1 | 10/2019 | Ponti | |

FOREIGN PATENT DOCUMENTS

| | | |
|---|---|---|
| EP | 0054856 A1 | 6/1982 |
| EP | 0330228 A2 | 2/1989 |
| EP | 0330228 A3 | 2/1989 |
| EP | 0399657 A1 | 11/1990 |
| EP | 0459672 A1 | 12/1991 |
| EP | 0535998 A1 | 4/1993 |
| EP | 0566338 A1 | 10/1993 |
| EP | 0731233 A1 | 9/1996 |
| EP | 1488912 A1 | 12/2004 |
| EP | 1880947 A2 | 1/2008 |
| EP | 1787801 B1 | 8/2009 |
| EP | 1799432 B1 | 1/2010 |
| EP | 2766269 A1 | 8/2014 |
| GB | 1593730 A | 7/1981 |
| GB | 2199017 A | 6/1988 |
| GB | 2249520 A | 5/1992 |
| GB | 2271095 A | 4/1994 |
| GB | 2276120 A | 9/1994 |
| GB | 2299048 A | 9/1996 |
| JP | S597014 A | 1/1984 |
| JP | 3266630 A | 11/1991 |
| JP | 5146996 A | 6/1993 |
| JP | 08-085148 A | 4/1996 |
| JP | 2003340936 A | 5/2002 |
| JP | 2003062917 A | 3/2003 |
| JP | 2003104361 A | 4/2003 |

(56) References Cited

FOREIGN PATENT DOCUMENTS

| JP | 2005343554 A | 12/2005 |
|---|---|---|
| JP | 2006001136 A | 1/2006 |
| JP | 2009006556 A | 1/2009 |
| KR | 20020006235 A | 1/2002 |
| KR | 20100137130 A | 12/2010 |
| MX | 9503047 A | 2/1997 |
| TW | 356126 | 4/1999 |
| TW | 416925 B | 1/2002 |
| TW | 200619094 | 6/2006 |
| TW | I306060 B | 2/2009 |
| WO | 9309032 A1 | 5/1993 |
| WO | 2005120965 A1 | 12/2005 |
| WO | 2006034502 A1 | 3/2006 |
| WO | 2007105964 A1 | 9/2007 |
| WO | 2012055429 A1 | 5/2012 |
| WO | 2013055407 A1 | 4/2013 |

OTHER PUBLICATIONS

European Patent Office, Written Opinion of International Searching Authority for PCT/US2014/071926 dated Jun. 30, 2015 (6 pages).
European Patent Office, Extended European Search Report for EP 16204731.0 dated Feb. 3, 2017 (9 pages).
European Patent Office, Extended European Search Report for EP 15204728.6 dated Feb. 3, 2017 (10 pages).
Taiwanese Intellectual Property Office, Office Action and Search Report for TW 105123775 dated Mar. 8, 2017, with English translation (5 pages).
Taiwanese Intellectual Property Office, Office Action and Search Report for TW 105123777 dated Mar. 8, 2017, with English translation (5 pages).
Partial International Search Report for PCT/US2014/071926 dated Apr. 28, 2015 (5 pages).
International Preliminary Report on Patentability for PCT/US2012/038316 dated Apr. 24, 2014.
International Search Report for PCT/US2012/029918 dated Jun. 19, 2012.
International Search Report for PCT/US2012/038316 dated Aug. 2, 2012.
Written Opinion of International Searching Authority for PCT/US2012/029918 dated Jun. 19, 2012.
Written Opinion of International Searching Authority for PCT/US2012/038316 dated Aug. 2, 2012.
Tri-Pack Plastics Ltd.; Web pages for "Chilled Foods," "Polypropylene Packaging," "Tree Tubes," "Transit Packaging," and "Returnable Post"; retrieved Jan. 18, 2010 from <http://www.tri-pack.co.uk/> and related sites (9 pages).
Wikipedia article: "Corrugated Fiberboard"; retrieved from <http://en.wikipedia.org/w/index.php?title=Corrugated_fiberboard&oldid=648589914> on Mar. 3, 2015 (7 pages).
Taiwanese Patent Office, Search Report for Taiwanese Application No. 101137741, dated Jun. 23, 2016 (1 page), with English translation.
European Patent Office; Extended European Search Report for European Application No. 18174415.2; dated Mar. 26, 2019; 7 pages.
European Patent Office, Communication pursuant to Article 94(3) EPC in European Application No. 15849285.0, dated Nov. 18, 2019, 6 pages.
European Patent Office, Extended European Search Report in European Application No. 17816258.2, dated Oct. 18, 2019, 12 pages.
European Patent Office, Communication pursuant to Article 94(3) EPC for European Application No. 17816258.2, dated Jul. 24, 2020, 5 pages.
European Patent Office; Communication pursuant to Rule 164(1) EPC, Partial Supplementary European Search Report for European Application No. 18821166.8; dated Feb. 23, 2021; 12 pages.

\* cited by examiner

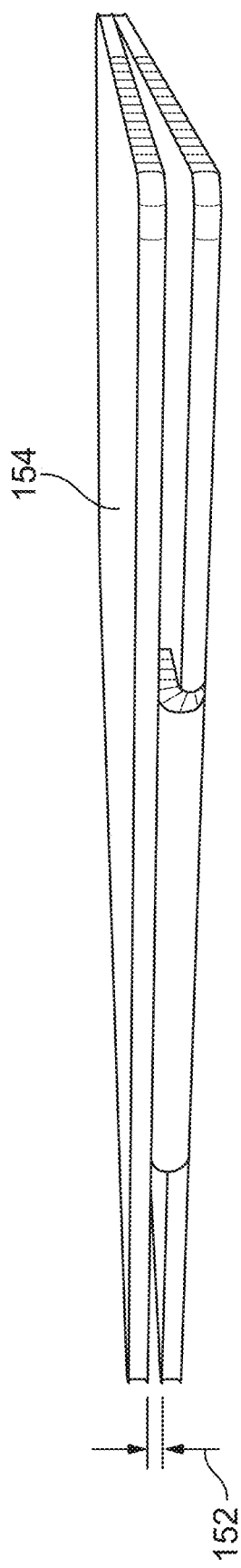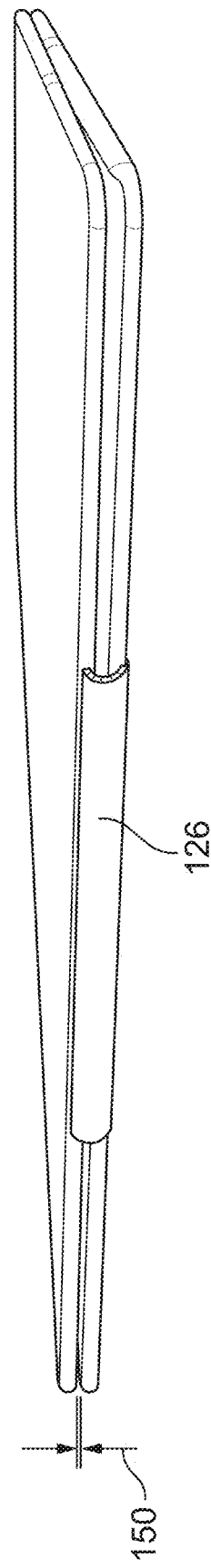
FIG. 13
FIG. 14

PROCESS FOR FORMING PLASTIC CORRUGATED CONTAINER AND INTERMEDIARY BLANK

CROSS-REFERENCE TO RELATED APPLICATIONS

The present application claims the benefit of U.S. Provisional Application No. 61/920,570 filed Dec. 24, 2013, the contents of which are incorporated herein by reference.

FEDERALLY SPONSORED RESEARCH OR DEVELOPMENT

N/A

TECHNICAL FIELD

The present invention generally relates to a reusable plastic corrugated container or more specifically box with smooth outer edges and sealed flap slots, and ultrasonically formed score lines, and to a process for manufacturing reusable plastic corrugated containers and boxes with smooth sealed outer edges and sealed flap slots, and having flap score lines that allow these containers and boxes to be used and reused in conventional paper corrugated packaging automation lines which may include case erectors, case packers, box closure and sealing systems, and palletizers.

BACKGROUND OF THE INVENTION

Corrugated plastic relates to extruded double-walled plastic-sheets, or liners, produced from polypropylene or polyethylene resin. Corrugated plastic sheets have a generally similar construction to corrugated paperboard. There are two layers of sheets or skins connected by flutes disposed and connected therebetween to form the corrugated sheet. One type of corrugated plastic material is known as "plastic profile board." As opposed to the flutes being undulating waves, as they are in paperboard corrugation and certain other plastic corrugated materials, the flutes in a plastic profile board are typically more like ribs and the profile is preferably extruded.

The plastic corrugated sheets can be transparent to allow light transmission, or they can be custom colored or translucent to signify an owner or manufacturer, or to block the transmission of light. The space between the outer skins act as an insulator. Graphics can also be applied to the outer surfaces and inner surfaces of the outer layers.

Chemically, corrugated plastic sheets are inert, with a neutral pH factor. At regular temperatures most oils, solvents and water have no effect, allowing the corriboard to perform under adverse weather conditions or as a product component exposed to harsh chemicals. Standard corrugated plastic sheets can be modified with additives, which are melt-blended into the sheet to meet specific needs of the end-user. Special products that require additives can include: ultra-violet protection, anti-static, flame retardant, custom colors, corrosive inhibitors, static-dissipative, among others.

The Wiley Encyclopedia in Packaging Technology ("Boxes, Corrugated" in The Wiley Encyclopedia of Packaging Technology, eds. Brody A and Marsh K, 2nd ed, John Wiley & Sons, New York) identifies the following standard flute designations used in the United States for paperboard corrugations:

| Flute Designation | Flutes per linear foot | Flute thickness (in) | Flutes per linear meter | Flute thickness (mm) |
| --- | --- | --- | --- | --- |
| A flute | 33 +/− 3 | 3/16 | 108 +/− 10 | 4.8 |
| B flute | 47 +/− 3 | 1/8 | 154 +/− 10 | 3.2 |
| C flute | 39 +/− 3 | 5/32 | 128 +/− 10 | 4.0 |
| E flute | 90 +/− 4 | 1/16 | 295 +/− 13 | 1.6 |
| F flute | 128 +/− 4 | 1/32 | 420 +/− 13 | 0.8 |

Corrugated plastic can be used to form boxes and other similar containers. A variety of equipment has been used to convert paper and plastic corrugated material into boxes. The equipment is selected based on production run size, box size, and box quality in terms of tolerances and aesthetic appearance. This equipment includes flexographic, silk screen and digital printing machines; quick set, rotary, clam shell or flatbed die cut machines; and manual, ultrasonic welding, and automated folding and gluing machines for assembly.

Paper corrugated boxes are often used only once and then discarded. After a paper corrugated blank is converted into a box and used, it cannot typically be re-used in automated packaging lines designed to work with new, straight and flat boxes. This is in part because the major and minor flaps of a paper corrugated box will not return to their original vertical alignment after use, and in part because the creases and scores of a paper corrugated box lose integrity with each use. In such instances, the flaps become floppy or limp. Additionally, paper boxes cannot be washed or otherwise cleaned, and therefore cannot be reused in instances where sanitation is important (e.g., food items, etc.)

Therefore, the industry has long sought a re-usable container (i.e., one that can be cleaned or sanitized and then re-used), and has attempted to make a re-usable plastic corrugated container. As with paper corrugated containers, it is desirable that plastic corrugated containers are able to be used with conventional paper converting equipment (e.g., equipment that folds a cut/scored blank of material into a box). Previous methods to convert plastic corrugated material into boxes have used conventional paper corrugated converting equipment and process flow. This process flow includes making plastic corrugated material blanks to the appropriate size and then die cutting the blank using quick set, rotary, clam shell or flatbed die cutting machines. The die cut blanks are then assembled by bonding a glue tab and one of the panels to form a box. The blank may also be printed upon.

A lingering problem with current attempts to create a re-usable plastic corrugated container is that it must be able to return (after being used in a box form) to a flat state with the flaps aligned or coplanar with the side wall panels of the blank in order to be refolded in the box converting equipment. Industry efforts to this point have failed to provide such a container. In particular, the fold or score lines connecting the upper or lower flaps or panels to the side panels of the box must be able to bend (i.e., during a box forming process), and also have sufficient memory to revert to a straight position (i.e., coplanar or aligned with the box side panel) to again be reformed into a box (after sanitizing) using the converting equipment. However, the score lines cannot be made with too much memory so that after use, they have too much bounce-back or spring-back making them difficult for the converting equipment.

In addition, it is desirable to seal the edges to prevent intrusion of water, bacteria, or other debris, bugs or contaminants into the fluted area. This is particularly important for containers used with food and pharmaceutical products. Previous methods for sealing the edges of plastic corrugated material boxes have used either clam shell or flatbed die cutting machines during the converting process. The seal is formed in the die cut process using heat and pressure to pinch and weld together the inner and outer surfaces of the plastic corrugated material along the edge. This forms a sealed, but sharp edge, which is not acceptably ergonomically safe in most applications. Some limited success has been found using these processes for lighter densities of plastic corrugated material. While the process still leaves a sharp edge, the lighter densities make edge sealing acceptable for limited use applications, but not multiple re-use applications.

In addition to the above problems, it is also desirable to reduce the number of steps needed to create and process plastic corrugated boxes and to increase the processing speed. Due to environmental concerns, it is anticipated that many companies will insist on or otherwise turn to re-usable containers in the near future. Thus, the demand for such containers will rise and the speed of the plastic container processing will become a more pressing issue.

Assignee of the present development, Orbis Corporation has been developing and refining plastic corrugated containers and the processes for forming them. Examples of recent Orbis Corporation developments are described in U.S. patent application Ser. No. 14/265,977, filed Apr. 30, 2014, titled "Plastic Corrugated Container with Sealed Edges", U.S. patent application Ser. No. 14/265,935, filed Apr. 30, 2014, titled "Plastic Corrugated Container with Manufacturer's Joint Adding Zero Extra Thickness", U.S. patent application Ser. No. 13/273,019, filed Oct. 13, 2011, titled "Plastic Corrugated Container with Improved Fold Lines and Method and Apparatus for Making Same,", U.S. Patent Application No. 61/920,570, filed Dec. 24, 2013, titled "Plastic Corrugated Manufacturing Process", and U.S. patent application Ser. No. 62/062,481, filed Oct. 10, 2014, titled "Plastic Corrugation", all of which are incorporated herein by reference.

Aspects of the present invention are applicable for a variety of container and box types. The most common box style is a regular slotted container (RSC) having four side panels with four top flaps (for forming a top) and four bottom flaps (for forming a bottom). For a rectangular shaped box, the two longer flaps are referred to as the major flaps and the two shorter flaps as the minor flaps. Another common box style is a half slotted container (HSC). The HSC is similar to the RSC except that it only includes the bottom set of flaps and has an open top. In the HSC, the top edge of the blank used to form the box becomes the upper edge of the box side panels. Other types of boxes (e.g., autolock, auto erect or crash lock boxes —ALB) can also be formed using various aspects of the invention as well.

The present invention is provided as an improved plastic corrugated container and process for forming the container.

SUMMARY OF THE INVENTION

The present invention provides an improved plastic corrugated box manufacturing process resulting in a plastic corrugated box with safe rounded sealed edges on the edges most frequently contacted by human hands. Sealing is desirable, particularly in certain applications such as transport and storage of food items. Sealing prevents food, insects, water, or other contaminants or debris from entering the interstices of the flutes in the corrugated material, and bacteria or mold from growing therein.

The process of the present invention also allows for the creation of a manufacturer's joint (the connection between one end of a blank with the other end when forming the blank into a box shape) that reduces the amount of bowing in a stack of blanks. Preferably, the manufacturer's joint adds no additional thickness to each blank. The process also allows for major and minor flap score lines that allow the plastic corrugated material boxes to return to an original straight position for use in conventional automated packaging lines. The process of the present invention also provides a plastic corrugated blank that can be converted into a box using conventional paper corrugated converting equipment.

The process confers a number of advantages over the prior art. For example, the resulting edge seals and score lines can be performed in a more controlled and, therefore, consistent process. This results in a more robust plastic corrugated box. Additionally, the plastic corrugated boxes prepared in this manner can be die cut and assembled on conventional paper corrugated converting equipment, including rotary die cutters, and can be processed at higher speeds. Also, the plastic corrugated boxes are able to return to their original shape as the score lines formed by the present invention will have "memory" that return major and minor flaps to straight after each use.

In one embodiment, the present invention provides a method for manufacturing a corrugated plastic blank that includes the steps of forming rounded edge seals on the perimeter edges of the blank, pre-sealing portions of the blank to form a plurality of areas in which major and minor flap slots, a glue tab, and a fourth side wall panel edge are desired, scoring the blank to form a plurality of flap hinges, and cutting the blank through the plurality of pre-sealed flap slots, glue tab and fourth side wall panel areas, leaving a sealed edge. The scoring is preferably performed by rotary ultrasonic reshaping of the corrugated structure in the score line.

The blank includes fold and/or score lines defining a pair of opposing side wall panels and a pair of opposing end wall panels. The blank also includes bottom and possibly top flaps extending from the pair of opposing side walls, and bottom and possibly top flaps extending from the pair of opposing end walls. The blank further includes rounded seals along the perimeter edges of the blank, and a plurality of flap slots sealed along their edges.

In accordance with one embodiment of the invention, a plastic corrugated box which can be reused in box converting machinery is disclosed. The plastic corrugated box comprises at least a first side wall panel having a top portion and a bottom portion and a first bottom flap connected to the bottom portion of the first side wall panel by a first ultrasonically formed score line. It has been found that ultrasonically forming the score line of a plastic corrugated box reshapes the structure of the plastic in that area. The reshaped structure allows for folding the flap about the score line when forming a box, and provides sufficient memory to return the flap to a straight position (i.e., coplanar or aligned with the plane of the side wall panel) after use. This enables the corrugated box to be collapsed and then (along with a stack of other similar boxes) reformed into a box in a box converting apparatus. Such apparatuses require the flaps to be straight and coplanar or aligned with the side wall panels.

The first bottom flap can be formed to include a smooth sealed lower edge. For a Half Slotted Container box style, the first side wall panel can be formed to include a smooth sealed upper edge.

The plastic corrugated box can further comprise a second side wall panel having a top portion and a bottom portion connected to the first side wall panel by a first fold line, a third side wall panel having a top portion and a bottom portion connected to the second side wall panel by a second fold line and a fourth side wall panel having a top portion and a bottom portion connected to the third side wall panel by a third fold line and to the first side wall panel by a manufacturer's joint. Similarly, the box can include a second bottom flap connected to the bottom portion of the second side wall panel by a second ultrasonically formed score line, a third bottom flap connected to the bottom portion of the third side wall panel by a third ultrasonically formed score line and a fourth bottom flap connected to the bottom portion of the fourth side wall panel by a fourth ultrasonically formed score line.

Again, for the Half Slotted Container style box, all of the bottom flaps can include a smooth sealed lower edge, and all of the side wall panels can include a smooth sealed upper edge.

For a Regular Slotted Container box style (and certain other box styles having top flaps), the box can include a first top flap connected to the top portion of the first side wall panel by a fifth ultrasonically formed score line, as well as a second top flap connected to the top portion of the second side wall panel by a sixth ultrasonically formed score line, a third top flap connected to the top portion of the third side wall panel by a seventh ultrasonically formed score line and a fourth top flap connected to the top portion of the fourth side wall panel by an eighth ultrasonically formed score line. Each of the top flaps can include a smooth sealed upper edge.

The ultrasonically formed score lines do not have to extend across a full width of the flap and/or corresponding side wall panel. Instead, the ultrasonically formed score line can comprise a plurality of spaced apart ultrasonically formed segments across a width of the flap and/or corresponding side wall panel.

In accordance with another aspect of the present invention, a plastic corrugated blank for forming a box is disclosed having a generally rectangular portion of plastic corrugated material. The blank includes a plurality of fold lines forming side edges of a plurality of side wall panels. The plastic corrugated material can have a first plurality of ultrasonically formed score lines where each score line of the first plurality of ultrasonically formed score lines forms an edge between one of the plurality of side wall panels and a bottom flap connected to the one side wall panel. Similarly, the plastic corrugated material can have a second plurality of ultrasonically formed score lines where each score line of the second plurality of ultrasonically formed score lines forms an edge between one of the plurality of side wall panels and a top flap connected to the one side wall panel. The blank can have a smooth sealed top edge and a smooth sealed bottom edge.

In accordance with another aspect of the present invention, a process for forming a re-useable plastic corrugated box is provided. The process comprises providing a sheet of plastic corrugated material having a top edge and a bottom edge and ultrasonically forming a first score line in the sheet of plastic corrugated material using an ultrasonic device.

The process can further include forming a plurality of fold lines in the sheet of plastic corrugated material where the fold lines define a plurality of side wall panels of the box and the first score line defines a bottom flap for one of the plurality of side wall panels. Additionally, the step of ultrasonically forming a first plurality of score lines in the sheet of plastic material can be performed where each of the first plurality of score lines define a bottom flap for a corresponding side wall panel.

The process can further comprise ultrasonically forming a second score line in the sheet of plastic corrugated material where the second score line defines a top flap for the one of the plurality of side wall panels, or ultrasonically forming a second plurality of score lines in the sheet of plastic material where each of the second plurality of score lines define a top flap for a corresponding side wall panel.

The process can further include forming a smooth sealed top edge of the sheet and forming a smooth sealed bottom edge of the sheet. The process can also include cutting slots between the bottom flaps and the top flaps, forming a glue tab at a first end of the sheet of corrugated material and, connecting the glue tab to a second opposing end of the sheet of corrugated material. Additionally, the process can include providing automated box converting equipment for opening and folding the sheet of plastic corrugated material.

The step of ultrasonically forming the score lines in the sheet of plastic corrugated material can comprise contacting a first surface of the sheet with an anvil of a rotary ultrasonic device. The anvil can be provided with a first projection on a contacting surface of the anvil. Additionally, this step can include contacting a second surface of the sheet opposing the first surface with a horn of the rotary ultrasonic device. The horn is provided to supply the ultrasonic energy. However, either the horn or the anvil can be configured to supply the ultrasonic energy to the sheet. Alternatively, other ultrasonic devices could also be used.

The ultrasonically formed score line can be continuous throughout each flap. Alternatively, each ultrasonic score line can be formed by ultrasonically reshaping a plurality of spaced apart linear segments in the sheet.

In accordance with yet another embodiment of the invention, a process for forming a plastic corrugated box is provided that comprises providing a generally rectangular sheet of plastic corrugated material having a first outer layer, a second outer layer and a plurality of flutes extending in a first direction between the first and second outer layers. The process further comprises forming a plurality of fold lines on the sheet in the first direction where the fold lines define a plurality of side panels of the box and ultrasonically forming a first plurality of score lines on the sheet in a second direction perpendicular to the first direction where the first plurality of score lines defining a plurality of bottom flaps extending from a bottom portion of the side panels. The process can further include ultrasonically forming a second plurality of score lines on the sheet in the second direction where the second plurality of score lines define a plurality of top flaps extending from a top portion of the side panels. The process further includes cutting a plurality of slots between the bottom flaps and cutting a plurality of slots between the top flaps. The cutting step can be performed in a die cutting machine.

Again, the ultrasonic forming of the score line can be performed with a rotary ultrasonic device having a horn and an anvil, or other ultrasonic devices.

The process can further include forming a glue tab at a first end of the plastic sheet and connecting the glue tab to a second end of the plastic sheet. The process can use box converting equipment by placing the plastic sheet in a box converting apparatus, opening the box using the apparatus and folding the bottom flaps using the apparatus.

One unique aspect of the invention involves pre-sealing portions of the corrugated plastic material in certain areas of the blank prior to performing other operations. As used herein, "pre-sealing" (or "pre-sealed") refers to crushing and/or welding or ironing the plastic so that it will no longer have memory to later revert to its original shape. This can include sufficiently melting some or all of the material in the area being pre-sealed. In effect, the pre-sealing bonds the two outer skins and intervening flutes of the material together so that the pre-sealed area maintains a permanently flattened state. Pre-sealing allows for forming a manufacturer's joint that does not (upon formation or later) increase the thickness of the blank. It also enables portions of the blank to be die cut more easily (e.g., for the flap slots) using conventional die cutting apparatuses, and with better results.

In accordance with yet another embodiment of the invention, a process for forming a plastic corrugated box having a plurality of side wall panels comprises providing a sheet of plastic corrugated material, forming a plurality of fold lines in the sheet where the fold lines define a plurality of side wall panels, forming a plurality of score lines in the sheet where the score lines define a plurality of flaps extending from the side wall panels, and pre-sealing a plurality of segments on the sheet at positions for forming a plurality of slots between the flaps. This pre-sealing step is performed prior to cutting slots between the flaps.

The process can further include pre-sealing at least a first portion of a first end of the sheet and at least a first portion of a second end of the sheet. These pre-sealed end portions can be used for formation of a manufacturer's joint (the connection of one end of the blank to the other end when forming a box).

The process can further include forming a smooth sealed top edge of the sheet and forming a smooth sealed bottom edge of the sheet. The smooth sealed edges can be formed using heated dies. The dies can be curved or arcuate, flat or some other smooth shape.

The process further includes cutting slots within the plurality of pre-sealed segments. This can be done by placing the sheet in a die cutting apparatus. The die cutting apparatus can also be used for cutting a second portion of the first end of the sheet to form a centrally located pre-sealing glue tab.

The step of pre-sealing a plurality of segments on the sheet at positions for forming a plurality of slots between the flaps can comprise applying heat and pressure to the sheet at the segment positions. Alternatively, this step can comprise ultrasonically welding the sheet at the segment positions. The ultrasonic welding can be performed by a plunge ultrasonic device or by a rotary ultrasonic device. If a rotary ultrasonic device is used the process can include the steps of contacting a rotatable anvil of the rotary ultrasonic device on a first outer surface of the sheet at the segment positions, and contacting a rotatable horn of the rotary ultrasonic device on a second outer surface of the sheet where the horn is aligned or in registration with the anvil.

Additionally, the process can include forming air escape holes in the sheet proximate the segment positions. This allows air trapped in the flutes between the outer sheets of the plastic corrugated material to escape during the pre-sealing step. Otherwise, random air holes (caused by trapped air) can form in the blank during this process and squeeze out of molten plastic (during pre-sealing) can extend beyond the blank edge.

Another issue that can occur during the pre-sealing process is lumps from excess plastic in the pre-sealed flattened areas. Accordingly, the process can include directing the excess plastic of the sheet formed when pre-sealing the segments into desired locations. One method of directing the excess plastic is providing the anvil (when using a rotary ultrasonic device, or the contacting surface of other types of ultrasonic devices) with a contacting surface having peaks and valleys. The valleys provide a location for the excess plastic to move to during the pre-sealing step. Preferably, the process includes providing an undulating wave pattern of raised ridges on the contacting surface.

In accordance with another embodiment of the present invention, a process for forming a plastic corrugated box comprises providing a generally rectangular sheet of plastic corrugated material having a first outer layer, a second outer layer and a plurality of flutes extending in a first direction between the first and second outer layers, forming a plurality of fold lines on the sheet in the first direction where the fold lines define a plurality of side panels of the box and forming a plurality of score lines on the sheet in a second direction perpendicular to the first direction where the plurality of score lines define a plurality of flaps extending from the side panels, and pre-sealing a plurality of segments on the sheet at positions for forming a plurality of slots between the flaps. The step of pre-sealing a plurality of segments on the sheet welds the first outer layer to the second outer layer at the segment positions.

Again, the process can include forming air escape holes in the sheet proximate the segment positions, and cutting flap slots in the pre-sealed segments.

The step of pre-sealing the plurality of segments comprises contacting the first outer layer of the sheet with an ultrasonic device having a contacting surface with a plurality of ridges. This can be done by rolling a rotatable anvil of the ultrasonic device on the first outer layer where the anvil has an undulating ridge pattern on the contacting surface.

In accord with yet another embodiment of the invention, a blank for forming a reusable plastic corrugated box is provided. The blank comprises a sheet of plastic corrugated material having a plurality of fold lines defining a plurality of side wall panels, a first plurality of score lines defining bottom flaps extending from a bottom portion of the side wall panels, and a first plurality of pre-sealed segments at positions for slots between the bottom flaps.

The blank can further include a second plurality of score lines. The second plurality of score lines define a plurality of top flaps extending from a top portion of the side wall panels, and a second plurality of pre-sealed segments at positions for slots between the top flaps.

The blank can further comprise a pre-sealed portion at a first end of the sheet and a pre-sealed portion at a second end of the sheet. These pre-sealed portions can be used to form a manufacturer's joint.

The blank can be provided with a smooth sealed top edge and a smooth sealed bottom edge. Additionally, the blank can have an air escape hole at each of the first plurality of pre-sealed segments and each of the second plurality of pre-sealed segments.

The blank can be further formed to include a cut-out slot in each of the first plurality of pre-sealed segments, as well as each of the second plurality of pre-sealed segments.

The first plurality of pre-sealed segments can have a ridge pattern (or other similar pattern) on an upper surface of the sheet. Similarly, each of the second plurality of pre-sealed segments can have a ridge pattern on an upper surface of the sheet, as well as the pre-sealed portion at the first end of the sheet. The pre-sealed portion at the second end of the sheet can have a ridge pattern on a lower surface of the sheet.

The pre-sealed portion at the first end of the sheet can be formed into a centrally located glue tab extending outward from the sheet. The glue tab can be connected to the other end of the blank. The corrugated plastic material has a first thickness and the pre-sealed portion at the first end of the sheet and the pre-sealed portion at the second end of the sheet collectively have a thickness less than twice the first thickness. Preferably, the combined thickness is equal to or less than the first thickness.

In accordance with another embodiment of the invention, a blank for forming a reusable plastic corrugated box comprises a generally rectangular sheet of plastic corrugated material having a first outer layer, a second outer layer and a plurality of flutes extending in a first direction between the first and second outer layers, a plurality of fold lines in the first direction defining a first side wall panel, a second side wall panel, a third side wall panel and a fourth side wall panel, a first plurality of score lines extending in a second direction perpendicular to the first direction defining a first bottom flap extending from a bottom portion of the first side wall panel, a second bottom flap extending from a bottom portion of the second side wall panel, a third bottom flap extending from a bottom portion of the third side wall panel and a fourth bottom flap extending from a bottom portion of the fourth side wall panel, and a first plurality of pre-sealed segments extending between the first and second bottom flaps, the second and third bottom flaps and the third and fourth bottom flaps. The blank can further comprise a second plurality of score lines extending in the second direction defining a first top flap extending from a top portion of the first side wall panel, a second top flap extending from a top portion of the second side wall panel, a third top flap extending from a top portion of the third side wall panel and a fourth top flap extending from a top portion of the fourth side wall panel, and a second plurality of pre-sealed segments extending between the first and second top flaps, the second and third top flaps and the third and fourth top flaps.

Additionally, the blank can have a plurality of air escape holes at each of the first plurality of pre-sealed segments and each of the second plurality of pre-sealed segments. In a later forming step (which may remove the portion of the blank having the air escape holes), the blank can have a cut-out slot in each of the first plurality of pre-sealed segments and in each of the second plurality of pre-sealed segments.

Each of the first plurality of pre-sealed segments and each of the second plurality of pre-sealed segments have a ridge pattern on an upper surface of the sheet. After the cut-out slots are formed, a portion of the ridge pattern can remain around each cut-out slot (i.e., the pre-sealed areas are typically wider than the slot cut-out in those areas).

Other aspects of the invention are disclosed in the description, claims and figures.

BRIEF DESCRIPTION OF THE DRAWINGS

To understand the present invention, it will now be described by way of example, with reference to the accompanying drawings in which:

FIG. 13 is a perspective view of a manufacturer's joint of a current blank;

FIG. 14 is a perspective view of a manufacturer's joint in accordance with the present invention;

DETAILED DESCRIPTION

Figure 1:
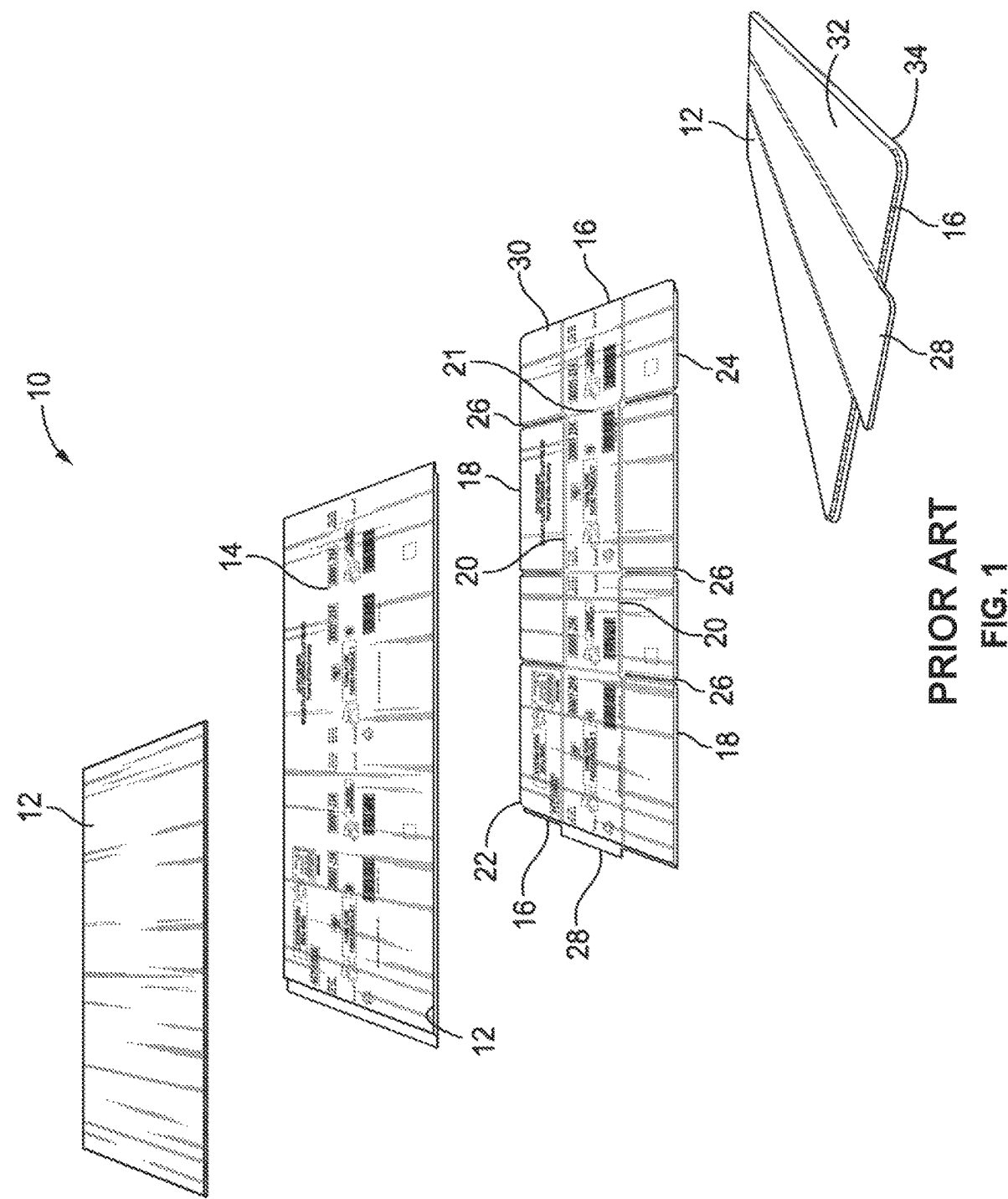
FIG. 1 is a schematic view of the prior art manufacturing process for a plastic corrugated box.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 illustrates a plurality 10 of progressively formed blanks 12 in a known method of forming plastic corrugated material into boxes using conventional converting equipment. The method includes the steps of obtaining a sized plastic corrugated blank 12, printing 14 thereon, if necessary, on one or both sides of the plastic corrugated blank 12, sealing the vertical edges 16 and the horizontal edges 18, forming scores (sometimes also referred to as scorelines) 20 therein and creating side wall panel fold lines 21 therein, and die cutting slots 26 for the major flaps 22 and minor flaps 24 (which form the top and bottom of the box) and a glue tab 28 at one end of the blank 12. The steps of sealing the edges 16, 18 and forming the scores 20 in the plastic corrugated blank 12 are preferably performed at the same time the blank 12 is die cut. Specifically, the edge seals 16, 18 are formed during the die cutting process using heat and pressure to weld together a first outer surface 32 and a second outer surface 34 of the plastic corrugated blank 12. The scores 20 are also formed by applying heat and pressure during the die cutting. The step of die cutting and forming the scores 20 cuts the plastic corrugated blank 12 into the desired shape, forming the major and minor flaps 22, 24, and the glue tab 28.

The known die cutting involved in this process can include the use of clam shell or flatbed machines. When using a clam shell die cutting machine in current methods, the back of a die board is heated which transfers heat to a heating rule. The heated die board cuts and seals the plastic corrugated material 12 against a steel plate at ambient temperature. When using a flatbed die cutting machine, the known method includes heating a steel cutting surface to transfer heat through the plastic corrugated material as it moves through the die cutting process. A die board at ambient temperature presses and cuts the plastic corrugated material 12 against the heated cutting surface to form a heated edge seal.

The step of printing is optional. If printing onto a surface 32, 34 of the plastic corrugated blank 12 is desired, it is conventionally performed using flexographic, silk screen, digital or other suitable methods.

The method also includes the steps of assembling a manufacturer's joint (i.e., connecting the glue tab 28 to the other end of the blank 12), and converting the glued blanks 12 to make finished boxes. In this instance, the boxes would have four side wall panels. The major and minor flaps would be folded to form a top and bottom to the box.

Figure 22:
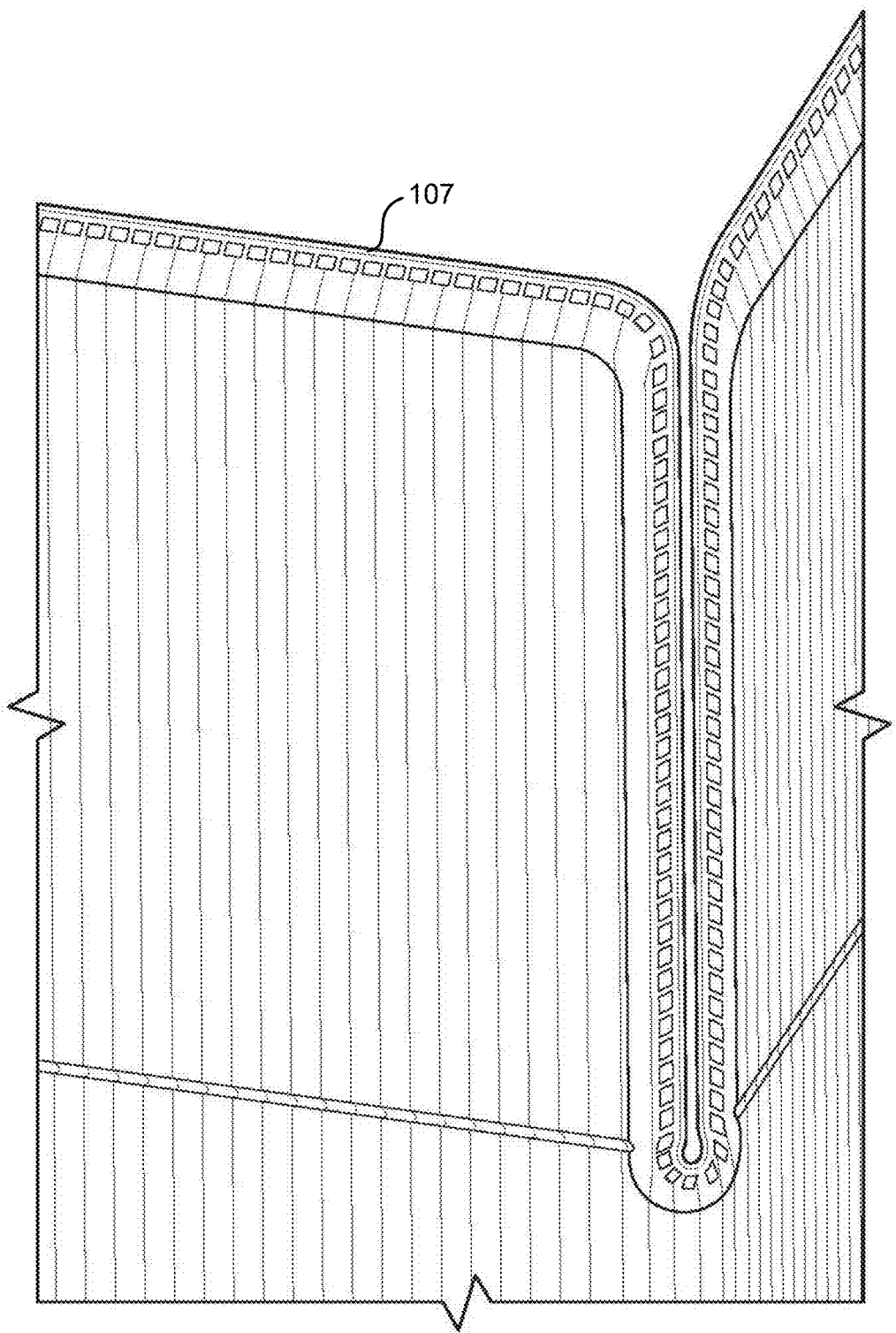
FIG. 22 is a perspective view of a corner of a plastic corrugated container with the edges of the flaps having a sharp die cut seal.
Figure 32:
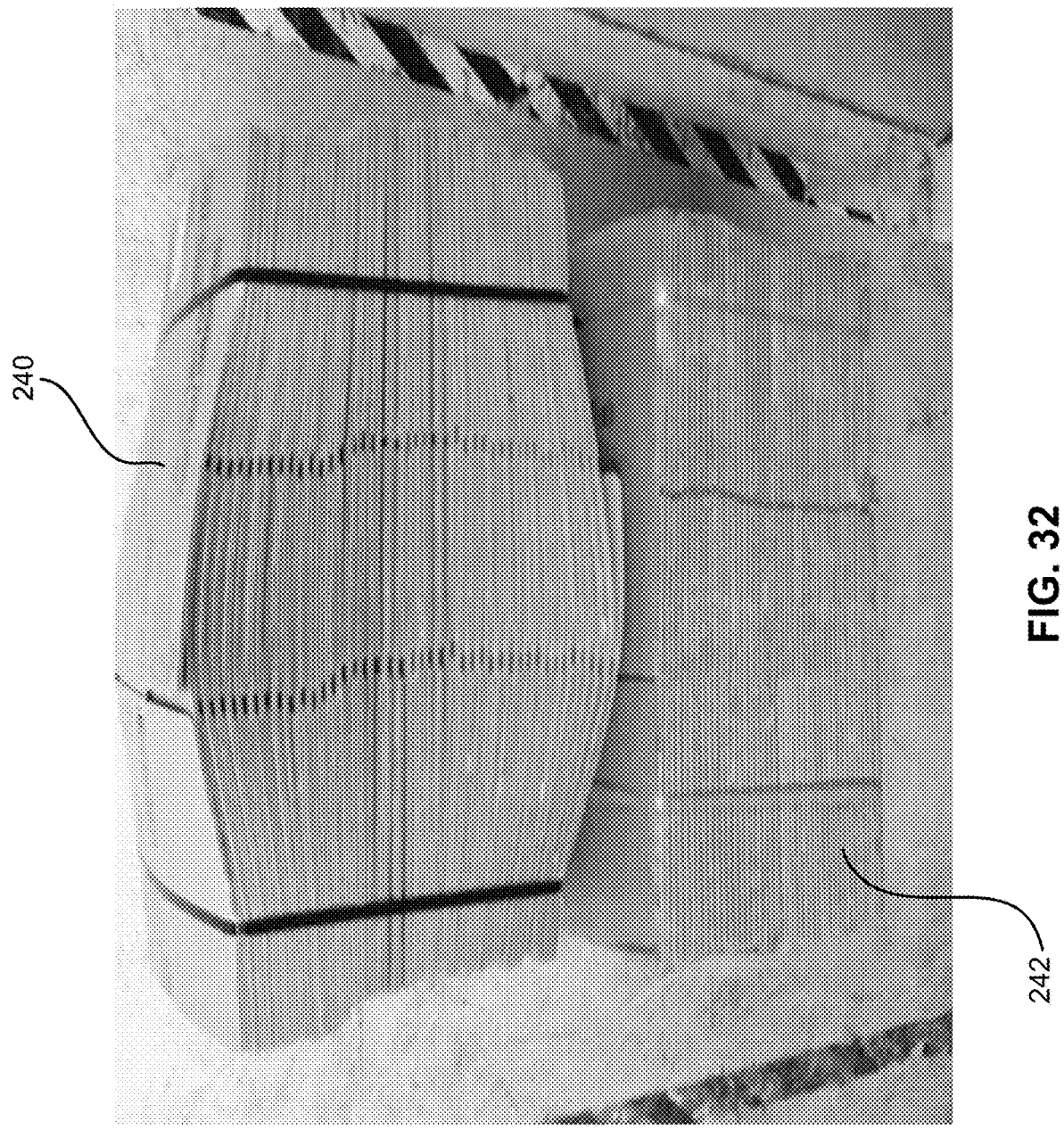
FIG. 32 is a perspective view of a stack of corrugated plastic blanks having a manufacturer's joint that had not been flattened or had reverted back to original thickness on top of a stack of corrugated paper blanks.

Problems with the known method include variations in quality and robustness of the seal(s) around the edges of the box. In this regard, the heated platen on the die cutter forms a sharp edge on the blank and particularly along the outer edges of the flaps 22, 24, resulting in potential lacerations to people involved in the process, and in using the blanks (an enlarged view of the sharp edges 107 after sealing during die cutting is shown in FIG. 22). Moreover, the die cut and scored blanks cannot be re-used currently with conventional converting equipment because (in part) the flaps formed in the known method do not return to a straight orientation generally coplanar with the side wall panels of the box after a first use. The known method also results in relatively slow die cut speeds. Additionally, the known method also produces boxes with a relatively thick manufacturer's joint. As illustrated in FIG. 32, the relatively thick manufacturer's joint formed in the known method causes a recognizable bowing in the center of a stack 240 of the glued plastic corrugated blanks.

The present invention provides a re-useable plastic corrugated box and a process for forming plastic corrugated boxes that can be easily cleaned and reused in conventional converting machinery typically used with paperboard corrugated boxes. The process includes pre-sealing (i.e., pre-crushing and/or welding or ironing of the corrugated plastic to remove memory) certain areas of a blank (i.e., a rectangular sheet of corrugated plastic) to be die cut (such as the flap slot areas and the manufacturer's joint), ultrasonically forming scorelines, and forming smooth, sealed edges across the flutes of the outer flaps (the smoothed edges can be rounded, flat or other configurations). The pre-sealed, ultrasonically scored and smooth, sealed edged sheet can then be placed in conventional converting systems for forming into boxes, and can be cleaned and reused in the converting systems. The process described herein takes into consideration both the movement or flow of plastic and air during the pre-sealing steps.

Figure 2:
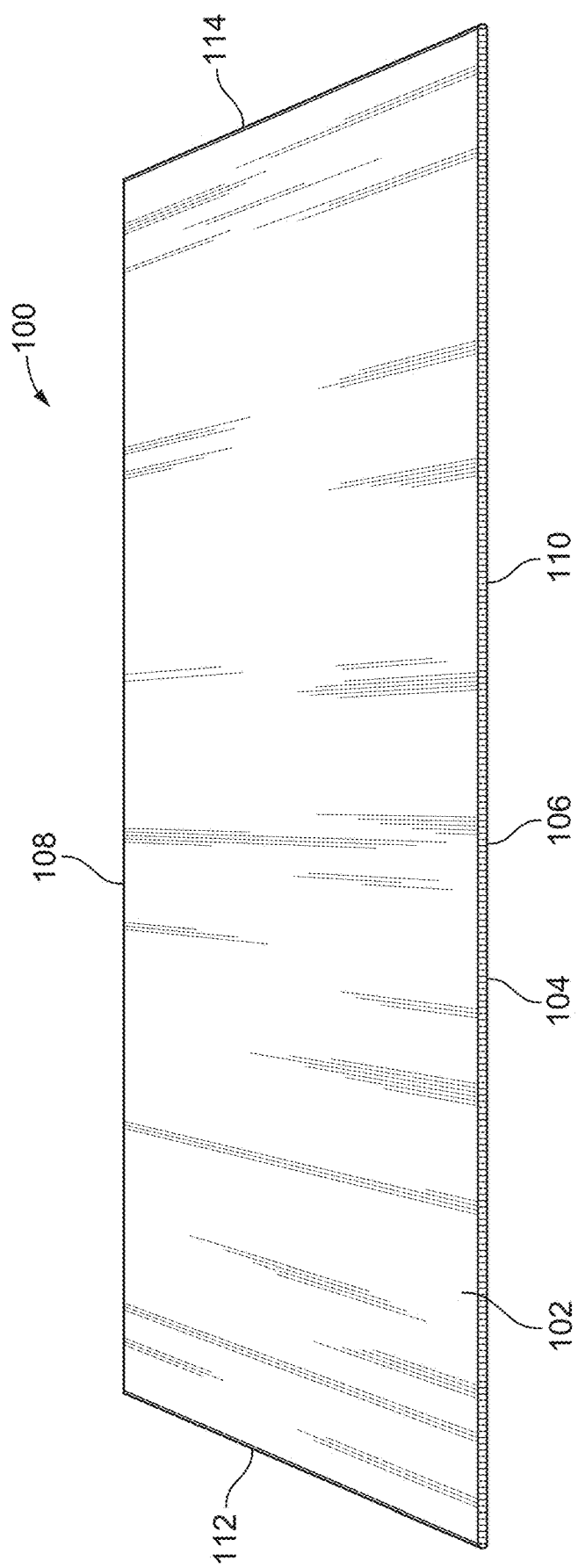
FIG. 2 is a perspective view of an extruded plastic corrugated blank for a plastic corrugated box in accordance with the present invention.

In accord with an embodiment of the present invention, a plastic corrugated rectangular blank 100 (FIG. 2) is initially formed using current plastic corrugated extrusion methods. FIG. 2 shows the blank 100 cut to its initial desired size. The size and shape of the blank (and the container or box formed from the blank) will depend on the desired application for which the finished box will be used. Plastic corrugated boxes can be used to store and transport any number of products from food items to automotive parts and can be made in many sizes and shapes. While the present invention is described in terms of a rectangular box having four side panels connected to top and bottom major and minor flaps, containers and boxes of various sizes and shapes (e.g., square, octagonal, etc.), can be made using the techniques and aspects of the invention(s) described herein.

When extruded, the blank 100 includes a first outer surface (or skin) 102 and a second outer surface 104. Between the first and second outer surfaces 102, 104 are a plurality of generally parallel flutes 106. Flutes formed in a profile board style corrugated plastic sheet are created by ribs between the two outer sheets 102, 104 (as opposed to undulating waves of material commonly found in paper corrugation and other types of corrugated plastic). As illustrated in FIG. 2, the blank 100 includes top and bottom edges 108 and 110 and first and second side edges 112 and 114. Terms such as "top," "bottom," "side" etc., are made with respect to the orientation of the blank, box or other components as shown and positioned in the Figures to facilitate the description thereof. Such terms are not intended to limit the invention in any manner and may change from Figure to Figure. For example, the "top" edge 108 shown in one Figure may end up being the edge of the "bottom" flaps as shown in another Figure. The top and bottom edges 108 and 110 run across the flutes 106 and will form the outer edges of any flaps formed in the blank 112 (or the top edge of the side panels of a half slotted container—HSC).

Figure 3:
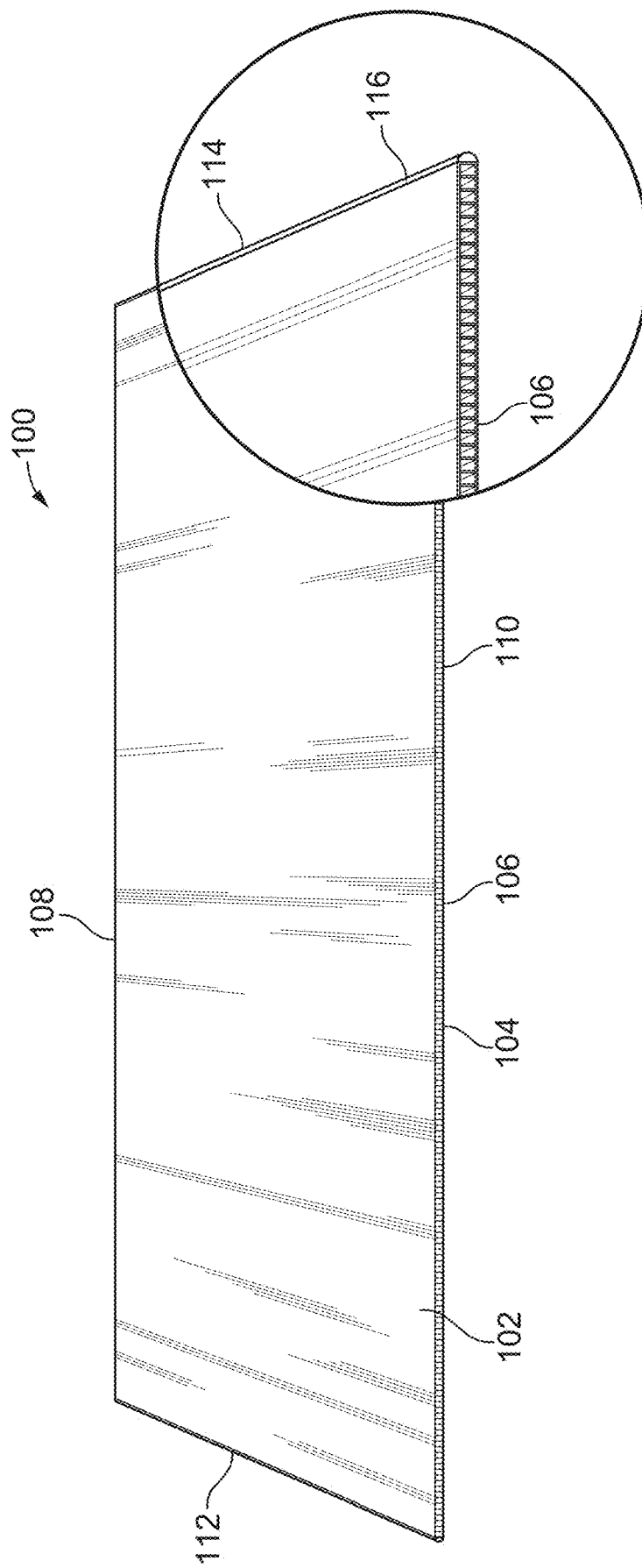
FIG. 3 is a perspective view of a plastic corrugated blank with its vertical edges sealed in accordance with the present invention.
Figure 15:
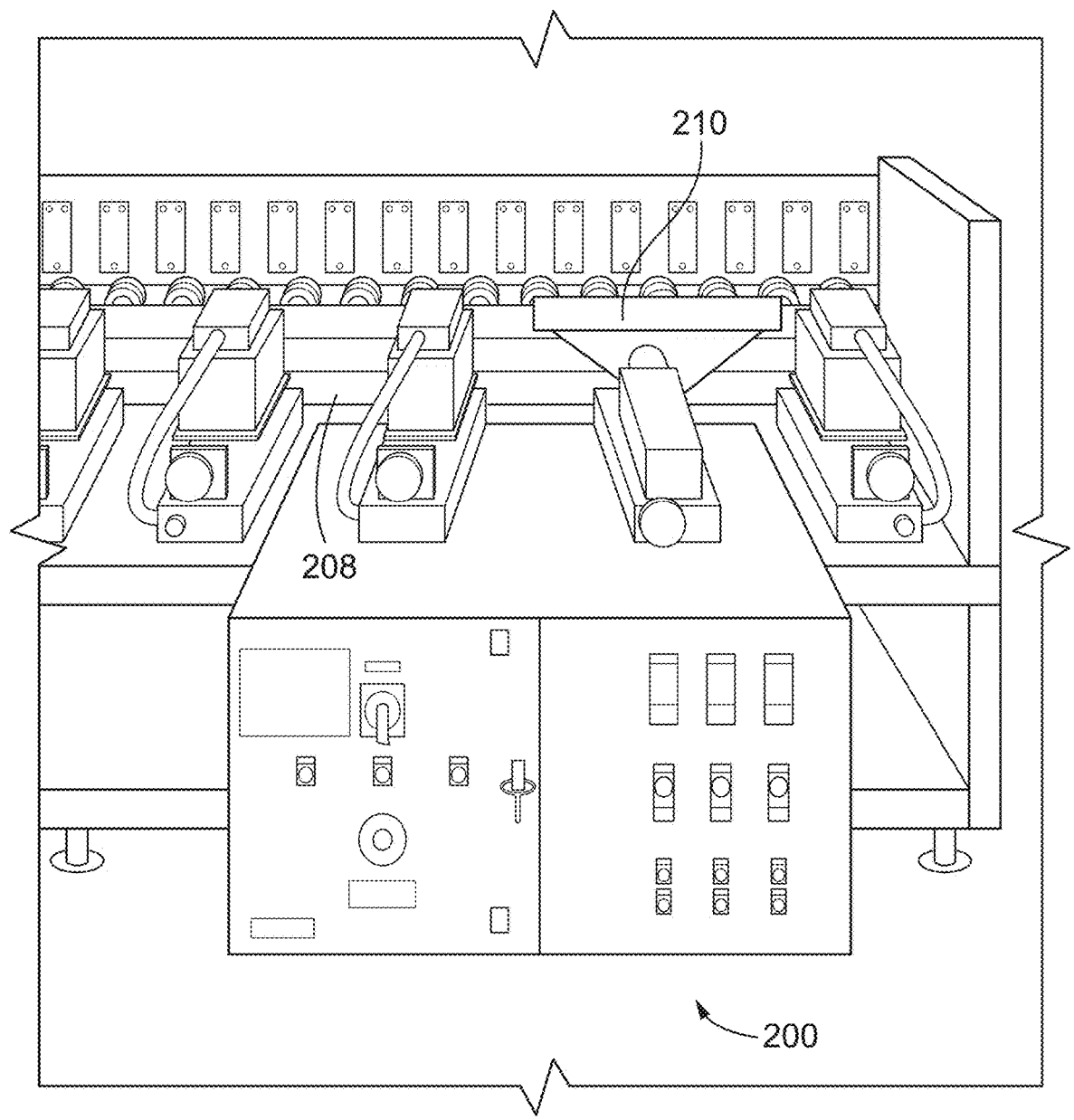
FIG. 15 is a perspective view of an apparatus for sealing the edges of the plastic corrugated blank in accordance with the present invention.
Figure 16:
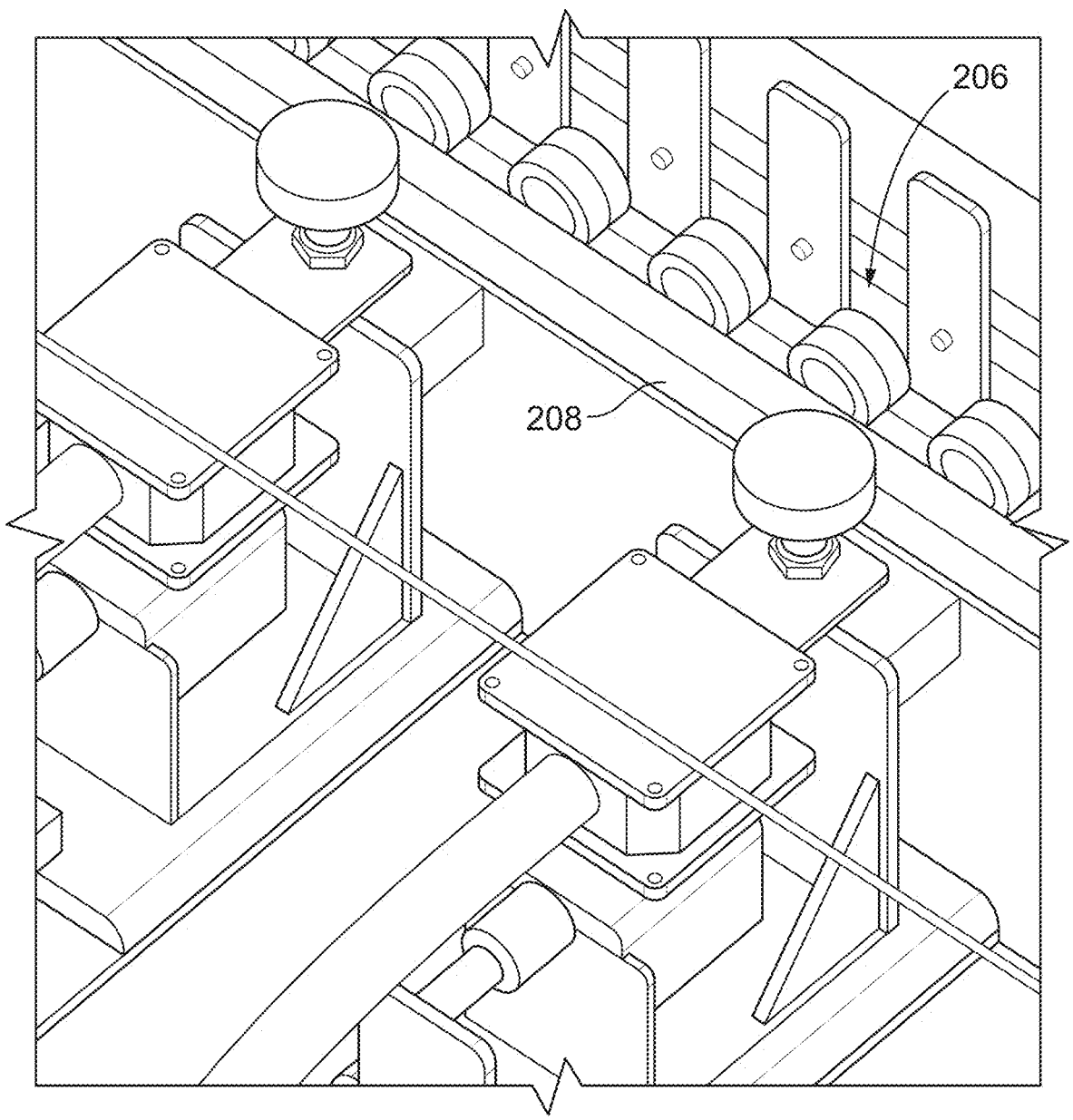
FIG. 16 is a perspective view of an apparatus for sealing the edges of the plastic corrugated blank in accordance with the present invention.

In one embodiment, the blank 100 is sealed along the first and second side edges 112 and 114 in the direction of the flutes 106, creating a first side edge seal 118 and a second side edge seal 116 (as described below, this can instead be preferably accomplished when pre-sealing an entire strip on either end of the blank 100 to form a manufacturer's joint and pre-sealing areas for slots between top and bottom flaps). FIG. 3 shows the second side edge seal 116 in an enlarged portion along the second side edge 114. It will be understood that the similar first side edge seal 118 will be created at the first side edge 112. The blank 100 is placed on a conveyor 206 (See FIGS. 15 and 16), where a hot air blower 207 (or multiple blowers) heats the first and second side edges 112 and 114 of the blank 100. A knife cuts through the flutes 106 on the edge to be sealed. The blank 100 is moved through multiple heated dies 208 to form a smooth edge. The blank 100 is then moved through an identically shaped cooling die 210. The heating and cooling dies 208 and 210 have generally C-shaped cross-sections 204. The sealing of both side edges 112, 114 can also be performed in a single pass. It is recognized that the die or dies can be progressive, meaning instead of a single die, there are multiple dies having a progressively different shape leading up to a final die with the final desired shape formed therein.

The heated dies 208 include a heated sealing and forming die 202 with a generally C-shaped section 204. The heated sealing and forming die 202 contacts the edges 112 and 114, and partially melts or reforms the edge to seal it and create a smooth rounded edge surface.

Figure 12:
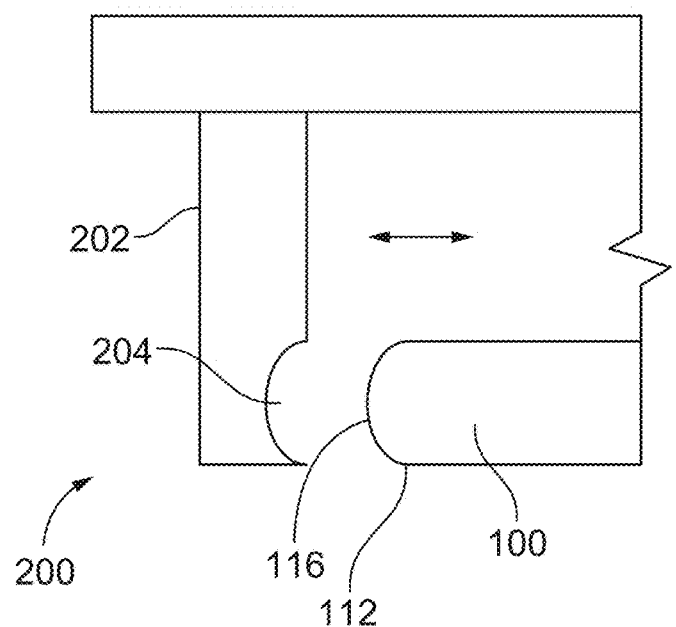
FIG. 12 is a schematic view of an apparatus for sealing the edges of the plastic corrugated blank in accordance with the present invention.
Figure 28:
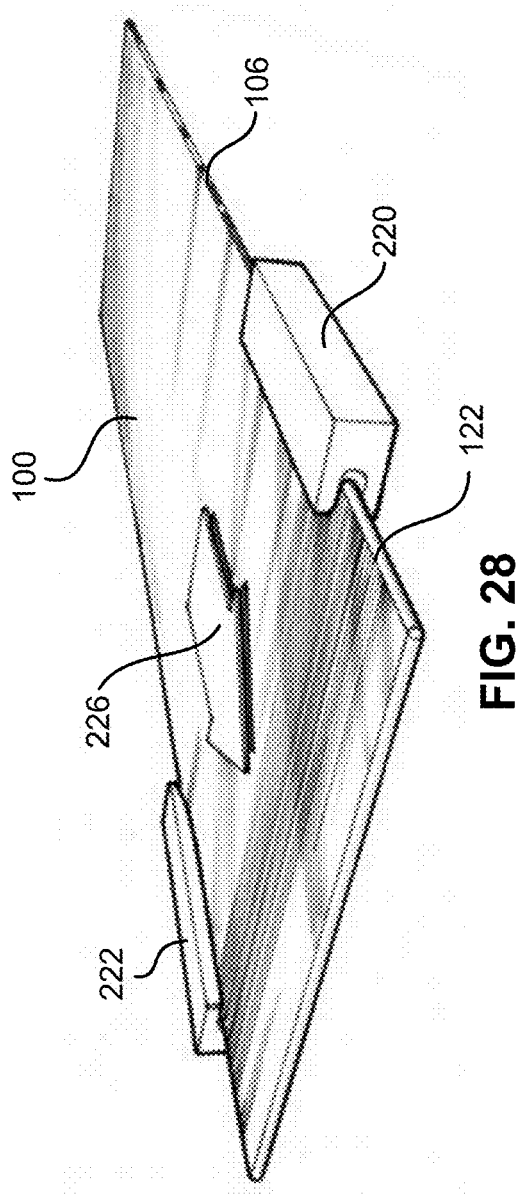
FIG. 28 is a perspective view of sealing dies forming a smooth sealed edge on a corrugated plastic blank.
Figure 29:
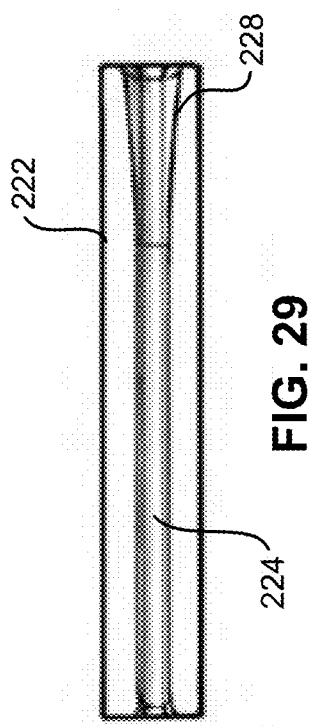
FIG. 29 is front plan view of one of the sealing dies of FIG. 28.

The top and bottom edges 108, 110 are then sealed as illustrated in FIG. 28. FIG. 28 shows a first sealing die 220 contacting the bottom edge 110 and a second sealing die 222 contacting the top edge 108 as the blank 100 is moved past the dies 220, 222. As shown in FIG. 29, the dies 220, 222 have an open slot 224 for receiving the edge portion of the blank 100. A heated element, such as that shown in cross-section in FIG. 12 contacts the edges of the blank 100 to form a smooth sealed edge as the blank 100 moves past the dies 220, 222 (in the direction of the arrow 226). The open slot 224 of each die 220, 222 can further include a flared portion 228 for receiving the leading portion of the blank 100 as it approaches the dies 220, 222.

As evident in FIG. 28, prior to entering the dies 220, 222, the edge of the blank 100 has open sides and exposed flutes 106. After passing through the dies 220, 222, a smooth sealed edge (e.g., 122) is formed and the interior of the blank as well as the flutes are not exposed.

Figure 4:
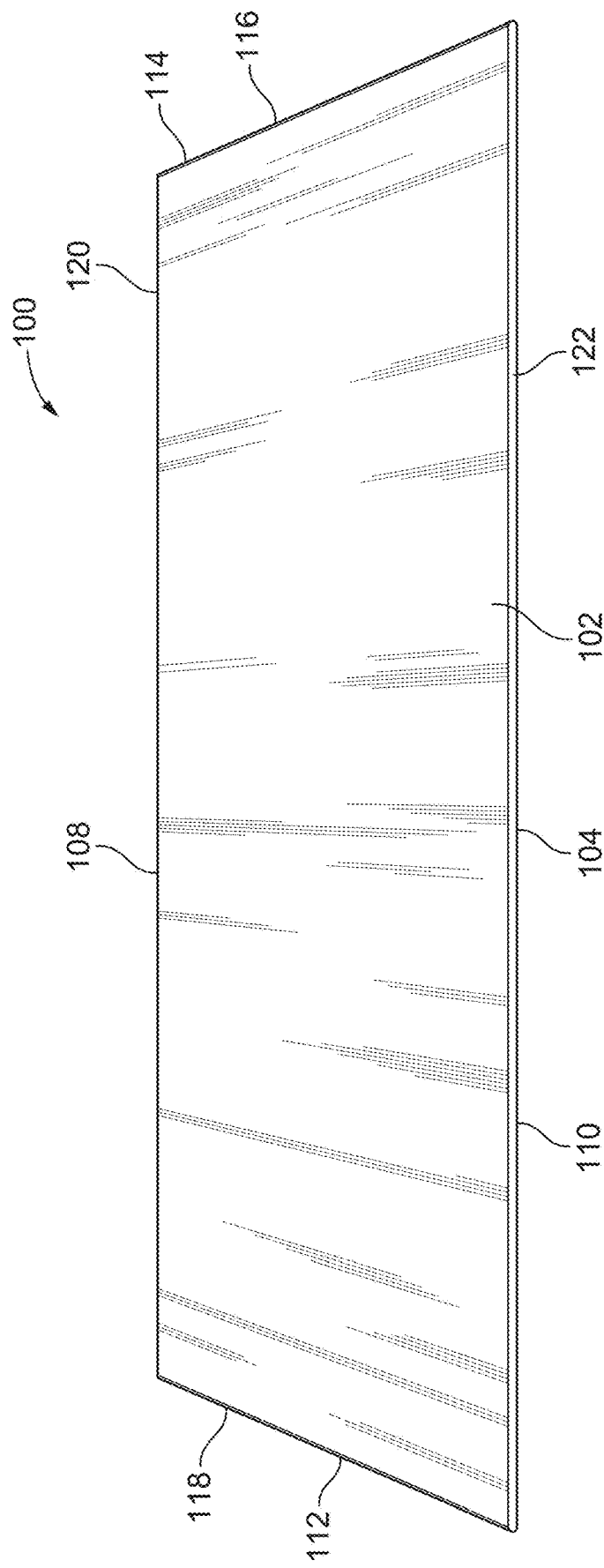
FIG. 4 is a perspective view of plastic corrugated blank sealed across its flutes in accordance with the present invention.
Figure 20:
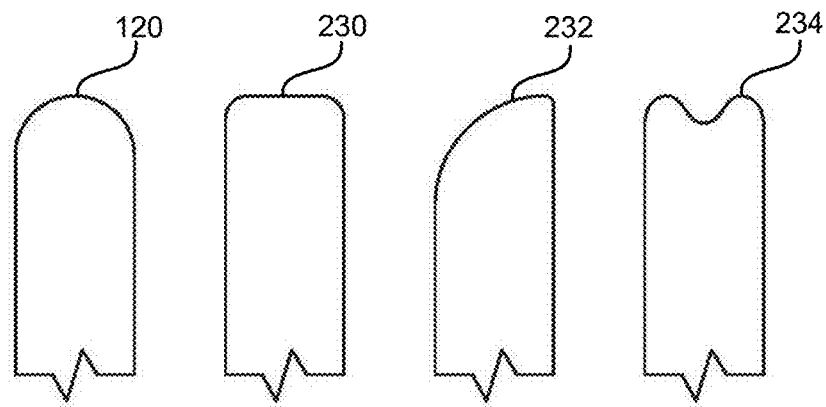
FIG. 20 is side plan view showing a variety of smooth sealed edge configurations.

FIG. 4 shows the top and bottom edges 108 and 110 sealed using the dies 220, 222 creating top and bottom smooth edge seals 120 and 122, respectively. Top and bottom edge seals 120 and 122 are sealed across the flutes 106, thereby closing the openings into the flutes which will prevent debris, liquids or other contaminants from becoming trapped in the interior of the sheet between the flutes 106. Moreover, this smooth sealing provides safe, smooth rounded seals 120 and 122 on the edges of the blank 100 most frequently contacted by human hands, namely the top edge 108 and bottom edges 110. It will be understood that this sealing process can be performed at any desired point in the process of the present invention. Additionally, the sealed edges can be flat or other shapes so long as they are relatively smooth. FIG. 20 shows (in cross-section) a rounded smooth sealed edge 120 and a number of possible variations 230, 232, 234 of smooth sealed edges.

Figure 5:
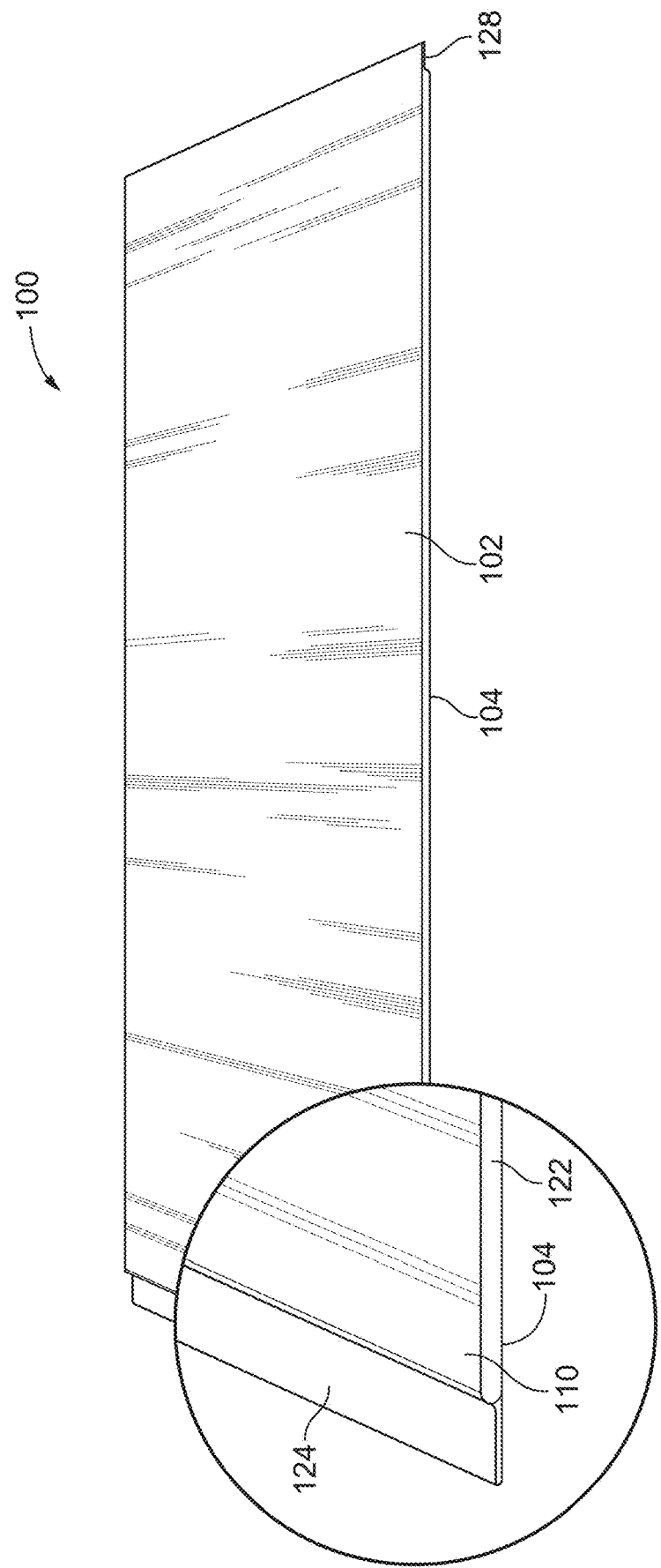
FIG. 5 is a perspective view of a plastic corrugated blank with pre-sealed glue tab and fourth panel areas in accordance with the present invention.
Figure 6:
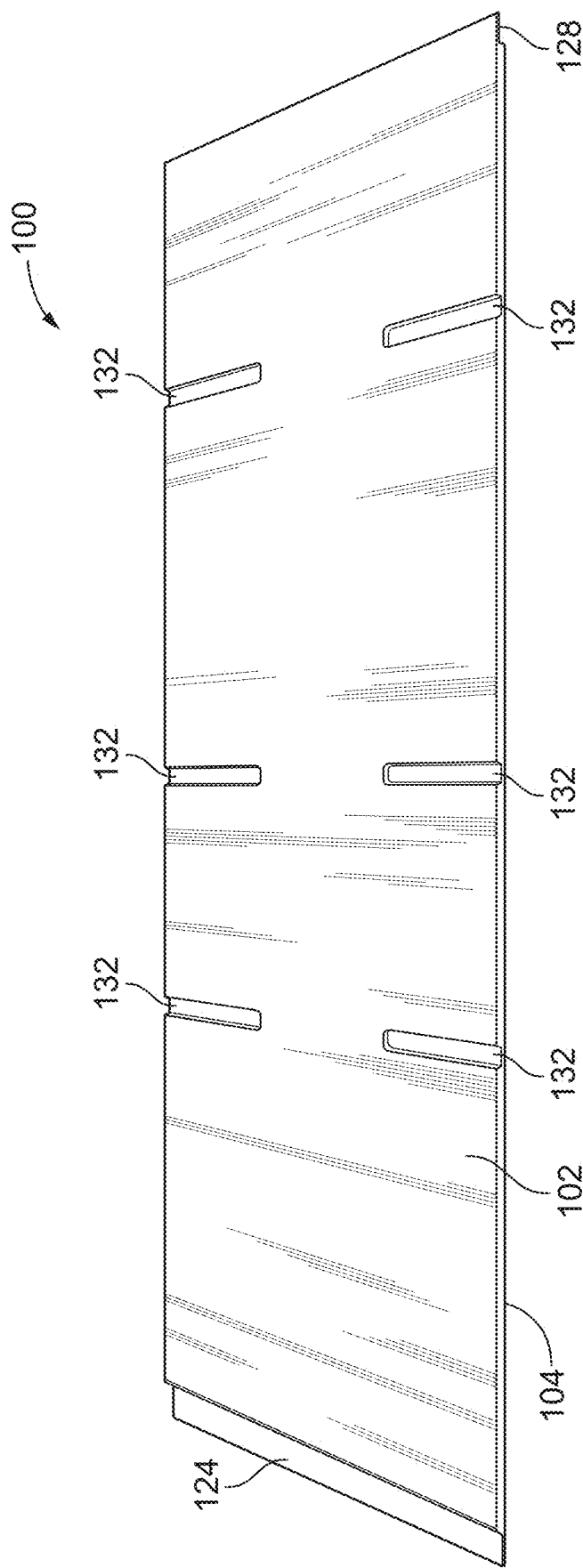
FIG. 6 is a perspective view of a plastic corrugated blank with pre-sealed major and minor flap areas in accordance with the present invention.
Figure 9:
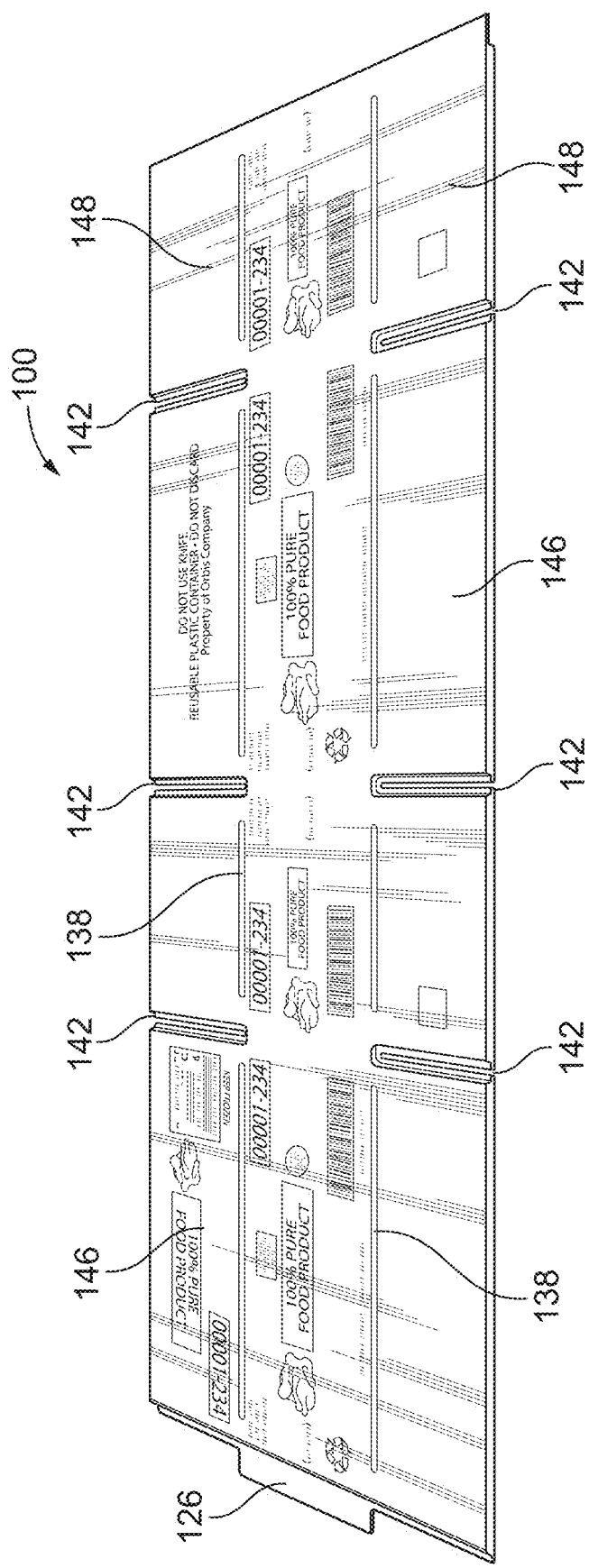
FIG. 9 is a perspective view of a plastic corrugated blank after the major and minor flap areas and glue tab area and fourth panel area have been die cut.
Figure 10:
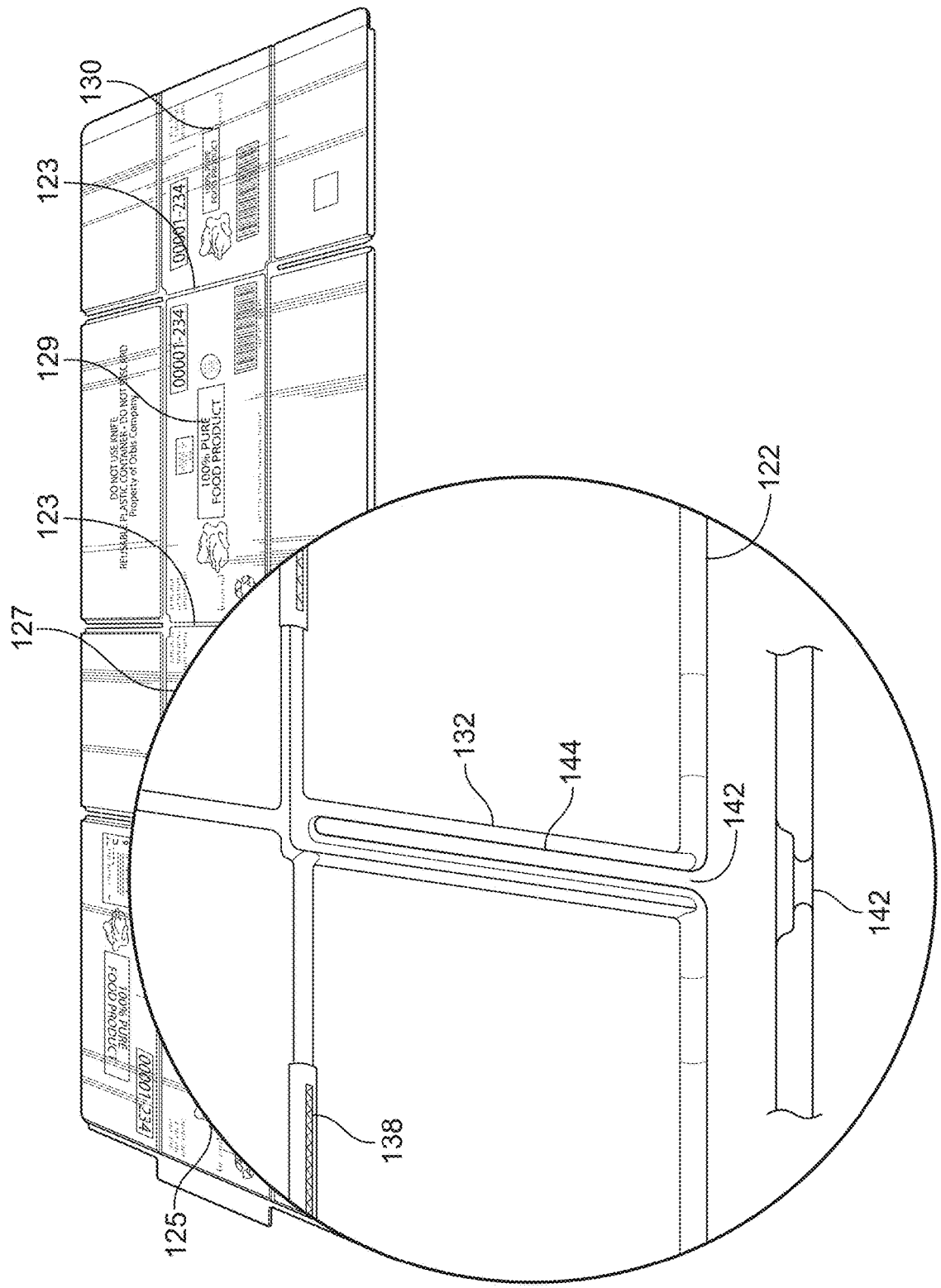
FIG. 10 is an enlarged view of the die cut flap area of FIG. 9.

As illustrated in FIG. 5, after sealing of the top and bottom edges 108, 110 (i.e., across the open or exposed flutes 106), the blank 100 is pre-sealed proximate the first and second side edges 112 and 114 in the desired area 124 for a glue tab 126 (the glue tab 126 is shown in FIG. 9) and a desired connection area 128 of a fourth side panel 130 (i.e. the glue tab 126 is considered to extend from the first side wall panel 125 of the completed box and is connected to the other end of the box designated as the fourth side wall panel 130—see e.g., FIG. 10). As mentioned above, this pre-sealing step can also seal the side edges 112, 114 of the blank 100 and thus the separate side edge sealing step discussed above may be eliminated. Moreover, the side edge pre-sealing can be done at the same time as pre-sealing the slot areas 132 (i.e., the areas between the flaps) as shown in FIG. 6 and discussed below. The pre-sealing can be accomplished using any suitable means, including heat and compression, plunge ultrasonic welding, or rotary ultrasonic welding.

Figure 33A:
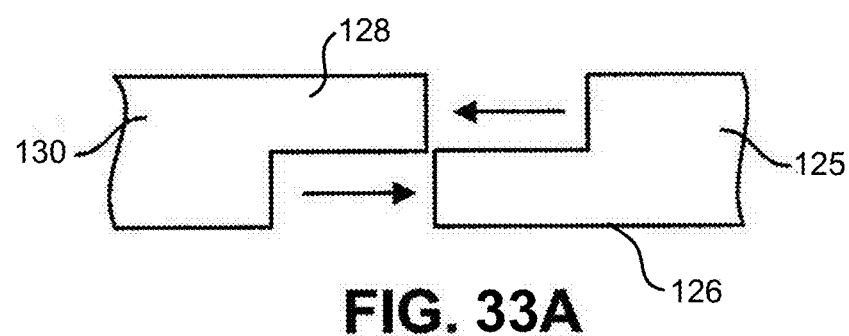
FIG. 33A is side plan view illustrating a pre-sealed glue tab and a pre-sealed edge area of a fourth panel prior to being connected.
Figure 33B:
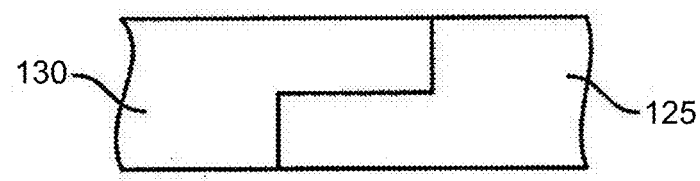
FIG. 33B is side plan view illustrating a pre-sealed glue tab and a pre-sealed edge area of a fourth panel after being connected.
Figure 34:
FIG. 34 is a perspective view of a stack of corrugated plastic blanks with a manufacturer's joint that does not add thickness to the blank.

In a subsequent step shown in FIG. 9, the pre-sealed edge 124 is cut leaving a centrally located glue tab 126. The glue tab 126 is connected (e.g., glued, although ultrasonic welding or other means may be used) to the pre-sealed area 128 of the fourth side wall panel 130 to create a plastic corrugated box. The glue tab 126 and area of the fourth side wall panel 128 the glue tab 126 is ultimately connected to is referred to as the "manufacturer's joint." An object of the invention is to create a manufacturer's joint that will not cause a stack of unformed boxes to unreasonably bow out in that area. For example, FIG. 32 which shows a stack 240 of corrugated plastic blanks formed using prior known converting processes on top of a stack 242 of paper blanks. As evident in this Figure, the stack 240 of corrugated plastic blanks has a thicker middle section due to the manufacturer's joint. Instead, it is desirable to reduce any bowing and have a relatively flat stack 244 of unformed boxes as shown in FIG. 34. Accordingly, it is desirable that at least one (and preferably both) of the glue tab 126 and the fourth panel area 128 be flattened during pre-sealing to a thickness less than the blank thickness (i.e., if one or both are pre-sealed to less than the blank thickness, the total thickness in that area will be less than two blank thicknesses). Moreover, it is preferable that the manufacturer's joint will have no added thickness beyond the thickness of the blank. That is, it is preferred that the glue tab 126 and fourth panel area 128 are pre-sealed so that the combined total thickness of the glue tab 124 and fourth panel area 128 is preferably equal to or less than a single blank thickness as shown in FIGS. 33A and B.

As illustrated in FIG. 14, a pre-sealed, pre-sealed glue tab 126 is connected to a pre-sealed, pre-sealed area 128 of the fourth side wall panel 130. This results in a manufacturer's joint having zero increased thickness 150. In comparison, a box 154 formed using current methods has an increased thickness 152 (an additional blank thickness) at the manufacturer's joint as shown in FIG. 13.

The blank 100 is also pre-sealed in the desired areas to form flattened and sealed segments 132 from which major and minor flap slots 142 of a resulting finished box 136 will be die cut (see FIGS. 6-10). The pre-sealing flattens the blank 100 in the desired slot areas, effectively welding the inner and outer surfaces 102, 104 and flutes 106 to each other. The pre-sealing can be created by any suitable means, including plunger ultrasonic welding, rotary ultrasonic welding or by using heat and compression rollers, with a preferred method being rotary ultrasonic welding.

Figure 7:
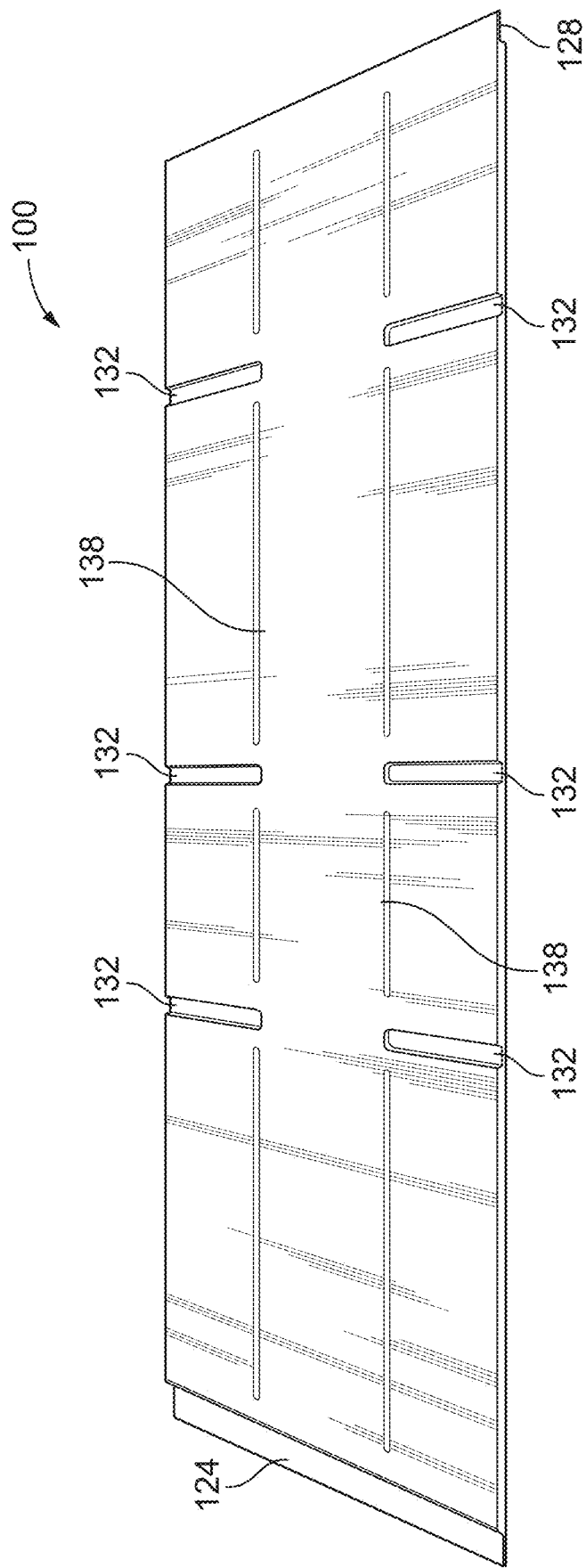
FIG. 7 is a perspective view of a plastic corrugated blank with major and minor flap scores in accordance with the present invention.

As shown in FIG. 7, score lines 138 are formed in the blank 100. The score lines 138 will form the major and minor flaps 146, 148 of the finished box 136. The scoring operation can be performed in accord with that disclosed in co-pending U.S. Ser. No. 13/273,019, filed Oct. 13, 2011, now U.S. Pat. No. 8,864,017, the contents of which are incorporated herein by reference. Briefly, the scoring from such application provides an intermittent welded score, leaving some portions of the score lines unwelded (i.e., not welded). Scoring using this method allows the major and minor flaps to be easily closed yet retain enough "memory" or "spring-back" such that after folding the flaps at the score, the flaps will return to its original shape and can be reused (after cleaning) in box converting machinery. It will be understood that the pre-sealing and the scoring can be performed such that the scoring takes place before the pre-sealing.

In another embodiment, the score lines 138 are formed using ultrasonic devices, such as with a rotary ultrasonic device, to reshape the corrugated plastic along the score line. The score lines using rotary ultrasonic reshaping can be a continuous line, or can be segmented, with sections of the score line left unchanged. Using rotary ultrasonic reshaping to form the score lines 138 allows easy folding of the major and minor flaps 146, 148 while having enough memory to return the flaps to a straight position after use (i.e., having the flaps align with the sides of the box as shown in the stack 244 of FIG. 34).

Figure 17A:
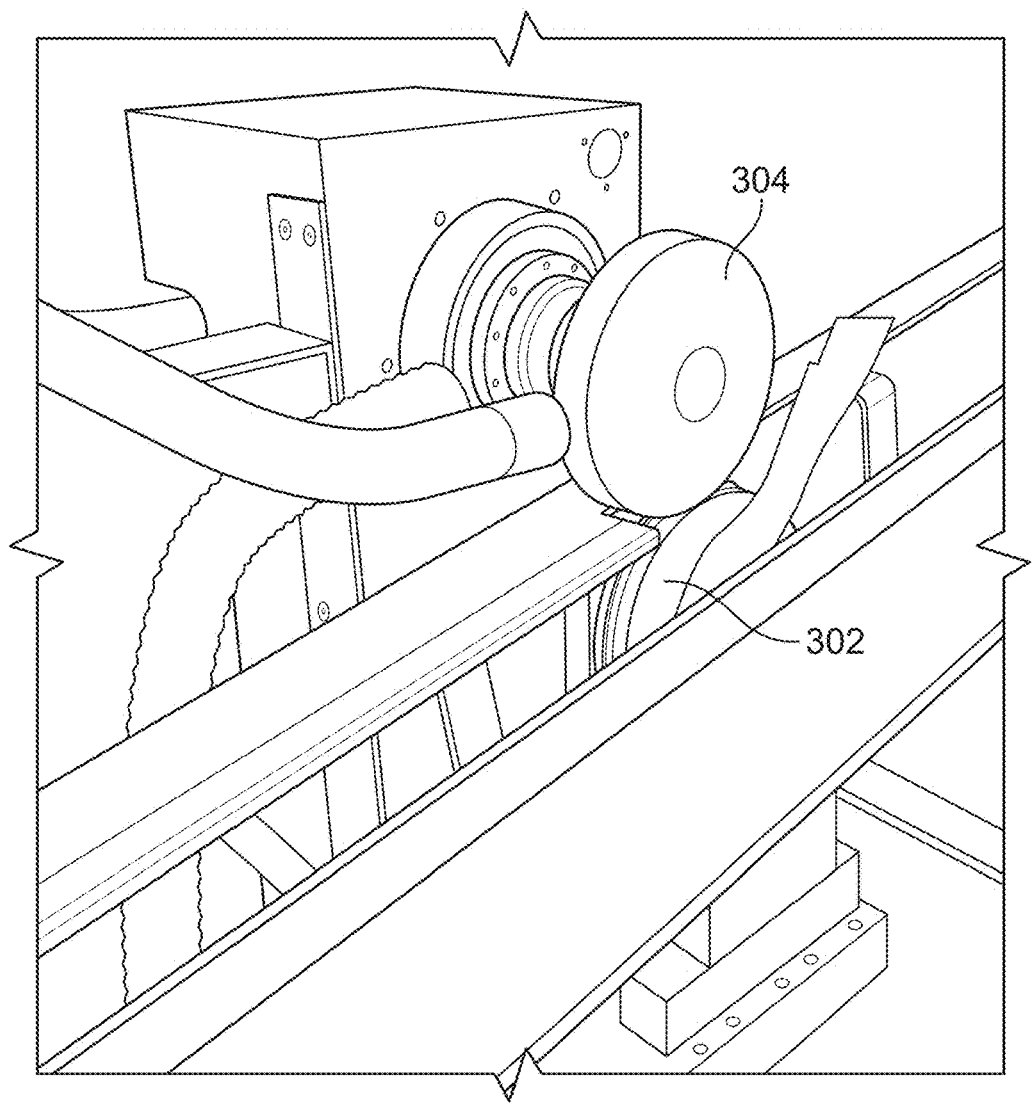
FIG. 17A is a perspective view of a rotary ultrasonic welding apparatus in accordance with the present invention.
Figure 18:
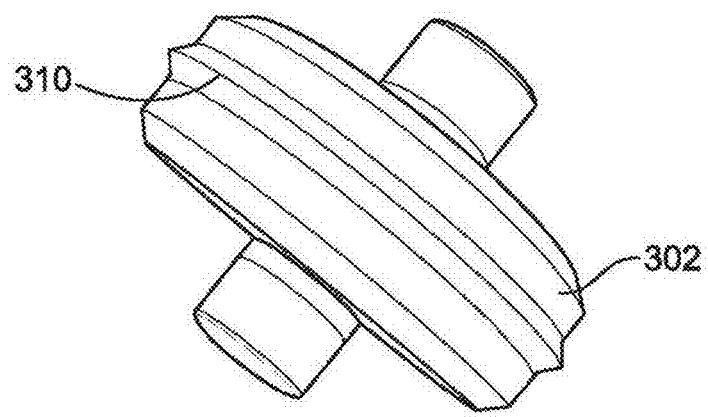
FIG. 18 is a perspective view of a rotary ultrasonic anvil in accordance with the present invention.
Figure 19:
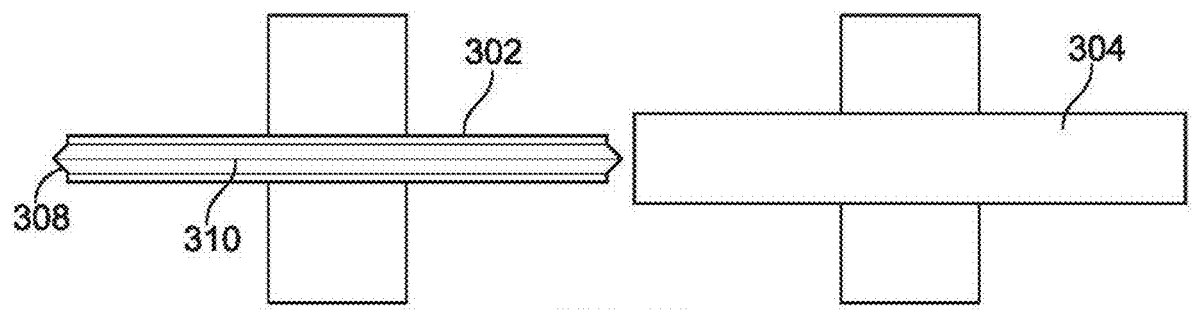
FIG. 19 is a plan view of a rotary ultrasonic anvil and horn in accordance with the present invention.

The rotary ultrasonic reshaping step of the present invention includes the plastic corrugated blank 100 being run in an ultrasonic device 300 illustrated in FIG. 17A. The ultrasonic device 300 includes an anvil 302 and a horn 304 (see e.g., FIGS. 17-19). The horn 304 imparts ultrasonic energy into the blank 100, thereby enabling the anvil to form a shaped score into the material. In extreme instances, the device 300 can weld the inner and outer sheets 102 and 104. Alternatively, the anvil 302 can impart the ultrasonic energy to the blank 100. Both the horn 304 and the anvil 302 can rotate about an axis.

Figure 17B:
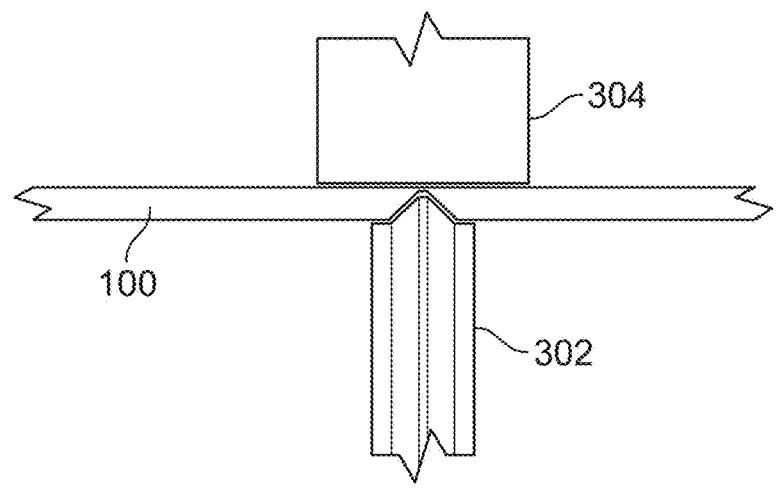
FIG. 17B is a plan view of a rotary ultrasonic welding horn and anvil forming a scoreline in a plastic corrugated blank.

The anvil 302 is shown having a central raised portion or projection 310 along a contacting surface of the anvil. The raised portion 310 is used to form the score lines 138. In effect, the plastic in the blank 100 reshapes around the projection 310 during the scoring operation to have a generally V-shaped cross-sectional profile as illustrated in FIG. 17B. It has been found that an angle 308 on the raised center portion 310 of the anvil 302 in the range of 90° to 120°, with a preferred angle 308 of about 110°, will provide the desired score lines 138 using rotary ultrasonic reshaping.

It has also been found that for the step of creating score lines 138 using rotary ultrasonic reshaping, a frequency in the range of 20 kilohertz is preferred. For creating the pre-sealed areas 124, 128 or 132 (when using ultrasonic devices) for the glue tab 126, fourth side wall panel area 128 and the major and minor flap slots 142, frequencies in the range of 15, 20, or 40 kilohertz are suitable.

Figure 8:
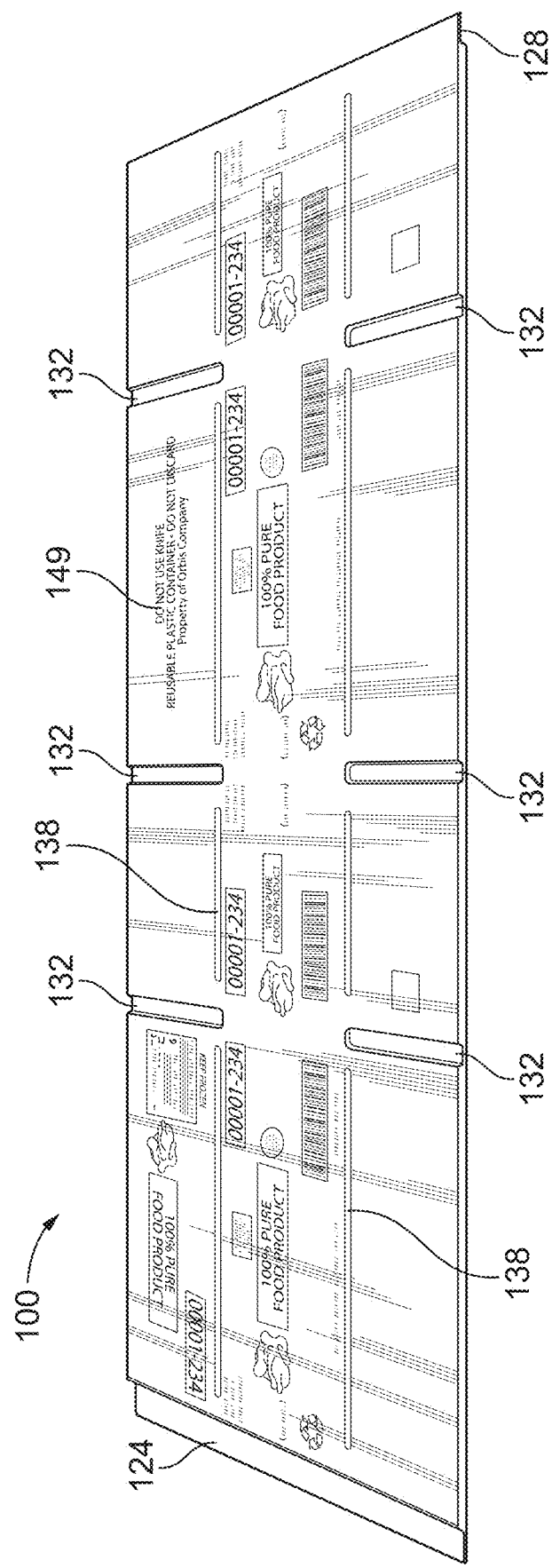
FIG. 8 is a perspective view of a plastic corrugated blank printed with indicia in accordance with the present invention.

The blank 100 can be printed upon if desired as shown in FIGS. 8 and 9. Printing can be done at any convenient step in the process. Printing can be done with silk screen, flexographic, digital, or any other suitable printing process. Printed indicia 140 on the blank 100 can include product information for products stored in the box, Department of Transportation required information, bar coding, or any other desired indicia.

After pre-sealing, the blank 100 can be die cut on any conventional corrugated die cut equipment, including quick set, clam shell, rotary or flatbed die cutting machines. The blank 100 is die cut in the areas having flattened segments 132 that have been pre-sealed where the major and minor flap slots 142 are desired (see FIGS. 9 and 10). The slots 142 are cut in the direction of the flutes 106. The slots 142 separate the flaps 146, 148 from each other. As shown in FIG. 10, the die cut slots 142 are narrower than the pre-sealed areas 132, leaving a sealed edge 144 around each slot 142. The pre-sealing of the slot areas 132 results in a sealed edge 144 that is more consistent than those formed in die cutting without pre-sealing. The die cut process also forms the glue tab 126. Alternatively, the major and minor flap slots 142 may also be cut or formed during the crushing and sealing operation described above. The die cut process also forms fold lines 123 separating the middle section of the blank 100 into the four side panels 125, 127, 129, and 130.

After being die cut, the blank 100 is folded so that the glue tab 126 is bonded to the edge area 128 of the fourth side wall panel 130, and the major and minor flaps 146, 148 are aligned or coplanar with the respective side wall panels 125, 127, 129, 130. A stack 244 of such glued blanks 100 is shown in FIG. 34.

Figure 11:
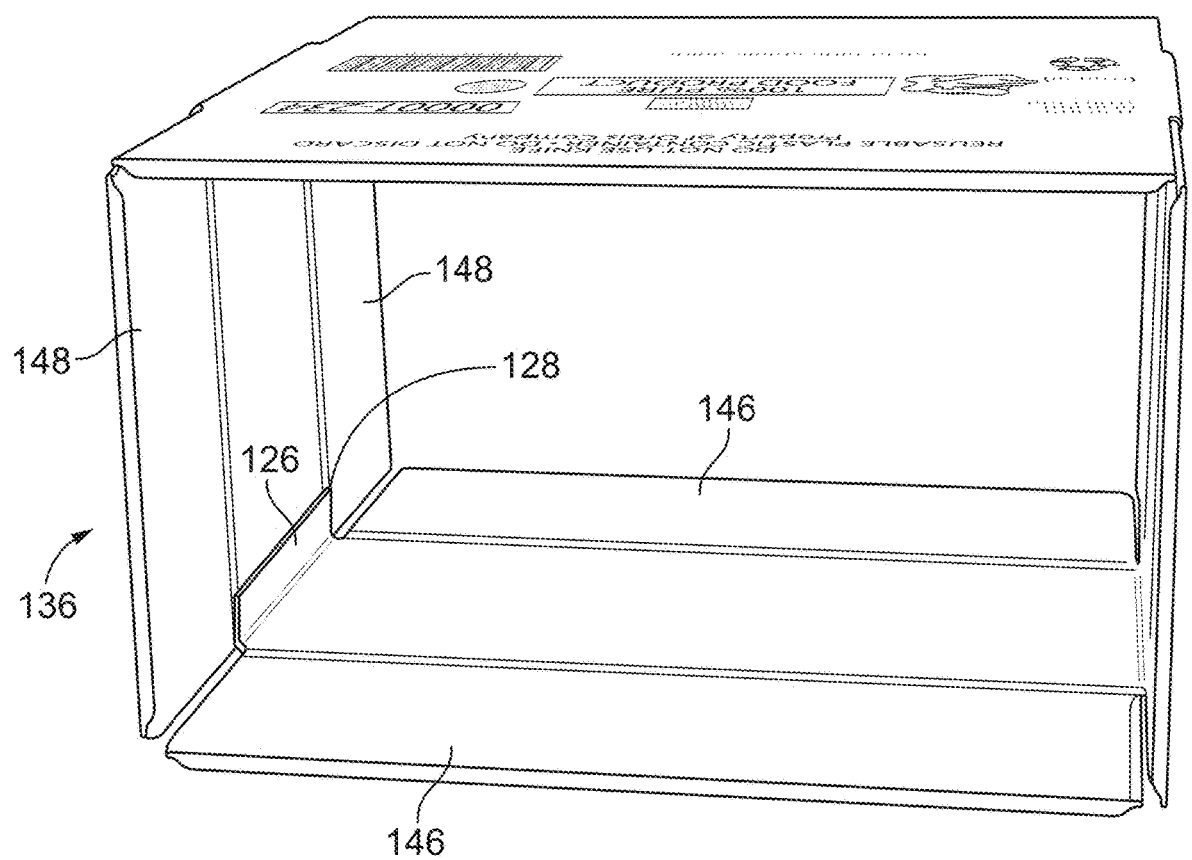
FIG. 11 is a perspective view of a plastic corrugated box constructed in accordance with the present invention.

The stack 244 is placed into a box converter to make a completed box. A partially completed box 136 is shown in FIG. 11. After opening the box 136 as shown in FIG. 11, the flaps are later folded to form a bottom and top of the box (the top flaps are typically folded after loading the box with the product being packaged). As set forth above, the present invention can also be used to form half slotted containers (i.e., open top boxes having only bottom flaps) as well as other types of boxes having different shapes.

Figure 21:
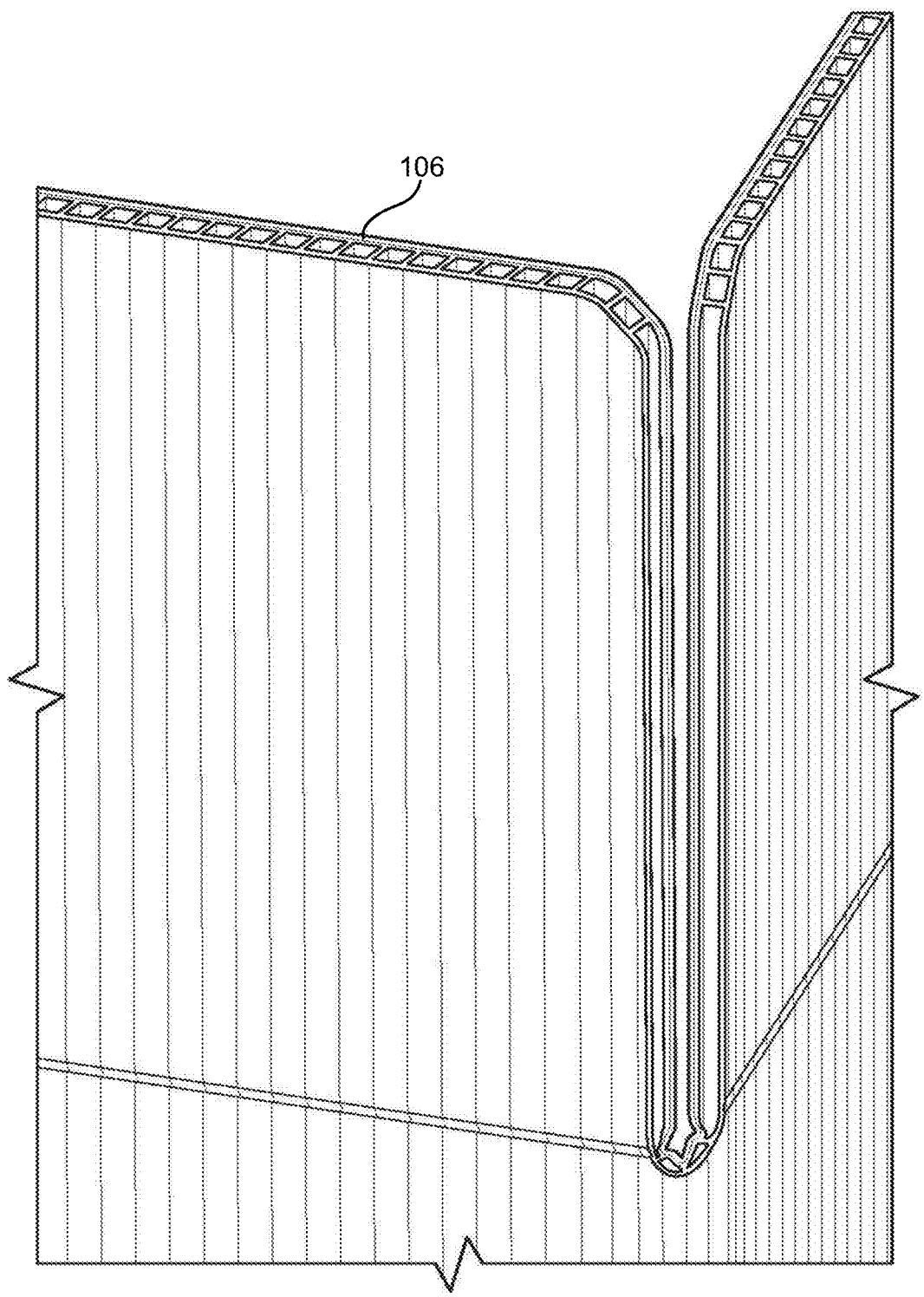
FIG. 21 is a perspective view of a corner of a plastic corrugated container with the edges of the flaps having unsealed open flutes.
Figure 23:
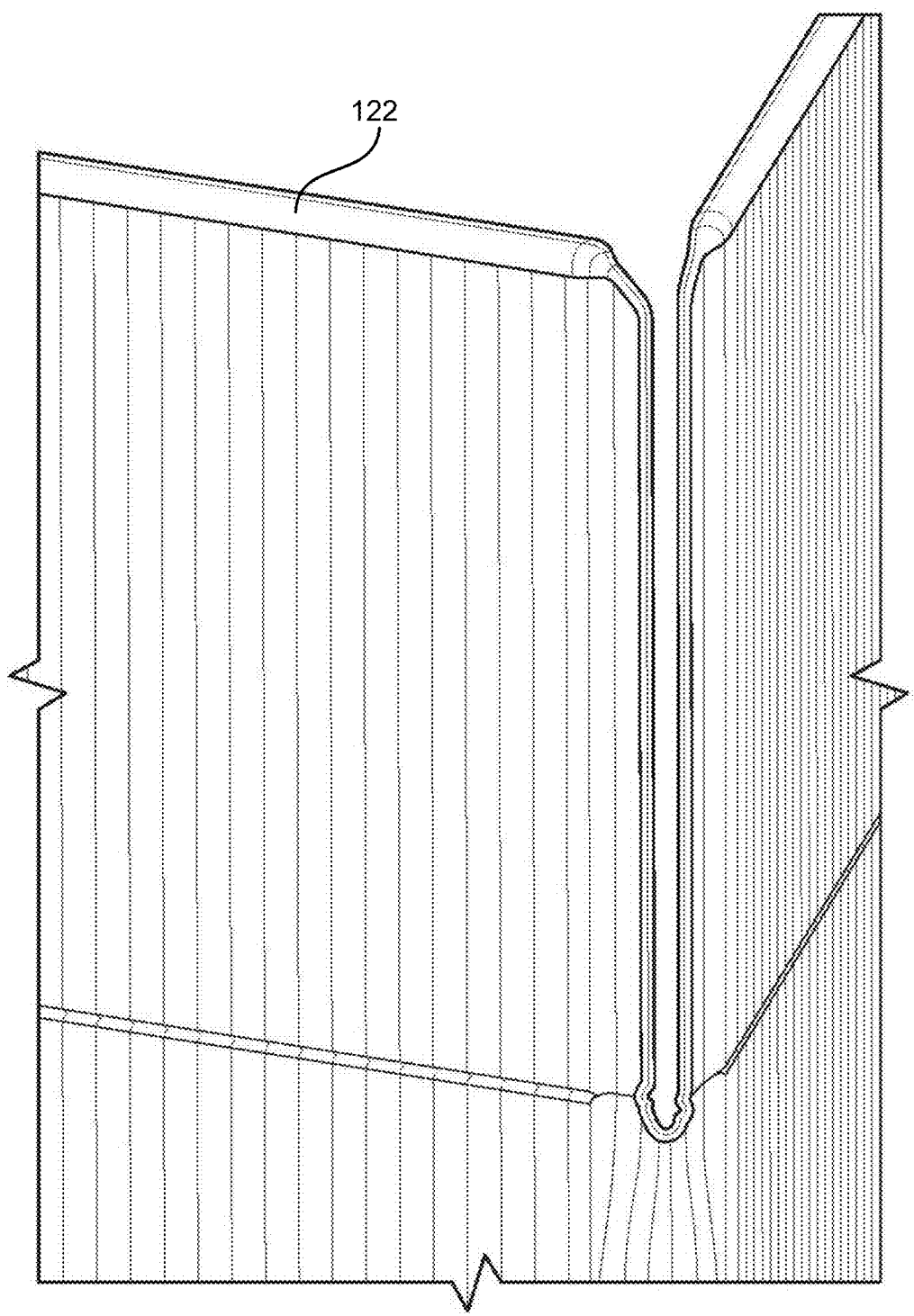
FIG. 23 is a perspective view of a corner of a plastic corrugated container with the edges of the flaps having a smooth seal.

FIGS. 21-23 provide a comparison of the outer edges of prior boxes with the current invention. FIG. 21 shows a first flap and a second flap of a box with edges that have not been sealed. Instead, the flaps have open edges showing the openings formed between the flutes 106. Open edges allow debris and liquid to enter the flutes 106 and contaminate the box for further use. Moreover, it would be difficult, if not impossible, to clean such boxes (especially using any automated process). FIG. 22 shows a first flap and a second flap having edges 107 that were sealed using heat and pressure to weld the edges together. This is typically accomplished during a die cut process. These edges are sharp, requiring those handling the boxes to wear gloves and other protective clothing. FIG. 23 shows a first flap and a second flap having a smooth rounded seal 120 in accordance with an aspect of the present invention. While the edge 120 of FIG. 23 is shown as being rounded, it can be flat or another shape (such as those shown in FIG. 20) as long as the box is sealed to a smooth edge at the typical human contact points. Additionally, the slot area between the flaps had been pre-sealed as discussed above, and has a smoother edge than the slot area of the die cut sealed box shown in FIG. 22.

FIG. 17B illustrates forming the scoreline 138 in the blank 100 using the ultrasonic horn 304 and anvil 302. As shown in cross-section, the projection 310 on the anvil 302 forms a V-shaped section into the bottom of the blank 100. It has been found that by manipulating certain variables associated with this process (e.g., the gap between the anvil 302 and the horn 304, the speed of the blank with respect to the anvil 302 and horn 304, the frequency or energy of the ultrasound, and the profile of the projection) that the resulting scoreline can be as strong or weak as desired for a particular use. For example, to create a scoreline with no or little memory (i.e., to form a limp flap), decrease the gap and speed of the blank and increase the frequency of the ultrasound. In contrast, to form a scoreline having a lot of memory (or spring-back), increase the gap and speed, and decrease the frequency. A multitude of variations in the flap memory or lack thereof are possible by gradually increasing or decreasing some or all of these variables.

The present invention is designed to handle various problems that may be encountered during some of the pre-sealing operations that can result in formation of an unacceptable box. For example, excess molten plastic may be formed during a pre-sealing operation. To accommodate this, the present invention provides a mechanism for managing the molten plastic, and directing it where to go. Additionally, the pre-sealing operation can encounter problems due to trapped air (i.e., between the ribs in the flutes) which can form bubbles and blowout holes as the pre-sealed areas are flattened. To fix this problem, air escape holes can be provided in the blank prior to the pre-sealing operation.

To direct molten plastic, the present invention contemplates contacting the areas to be pre-sealed with a surface having some shape (e.g., peaks and valleys) that directs the molten plastic to particular areas. For pre-sealing using a rotary ultrasonic device, this can be accomplished by providing a ridged pattern on one or both of a rotary anvil and horn.

Figure 24:
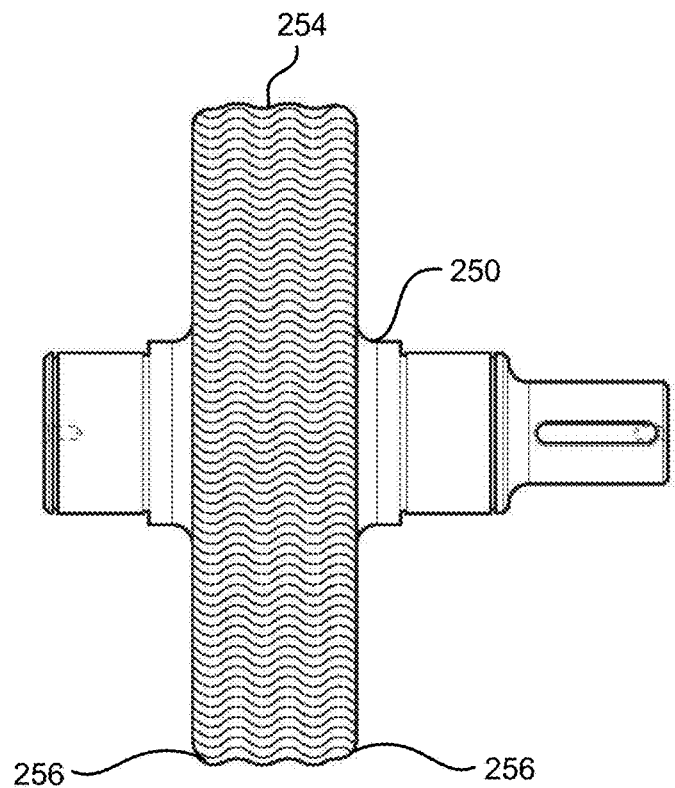
FIG. 24 is a front plan view of a rotary ultrasonic device anvil having an undulating, ridged contacting surface for forming a pre-sealed area on a plastic corrugated blank.
Figure 25:
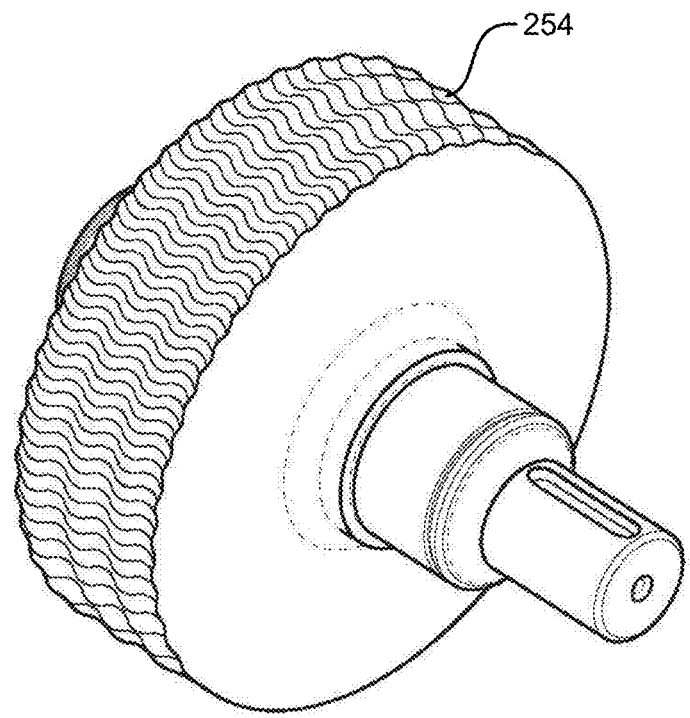
FIG. 25 is a perspective view of the rotary ultrasonic device anvil of FIG. 24.
Figure 26:
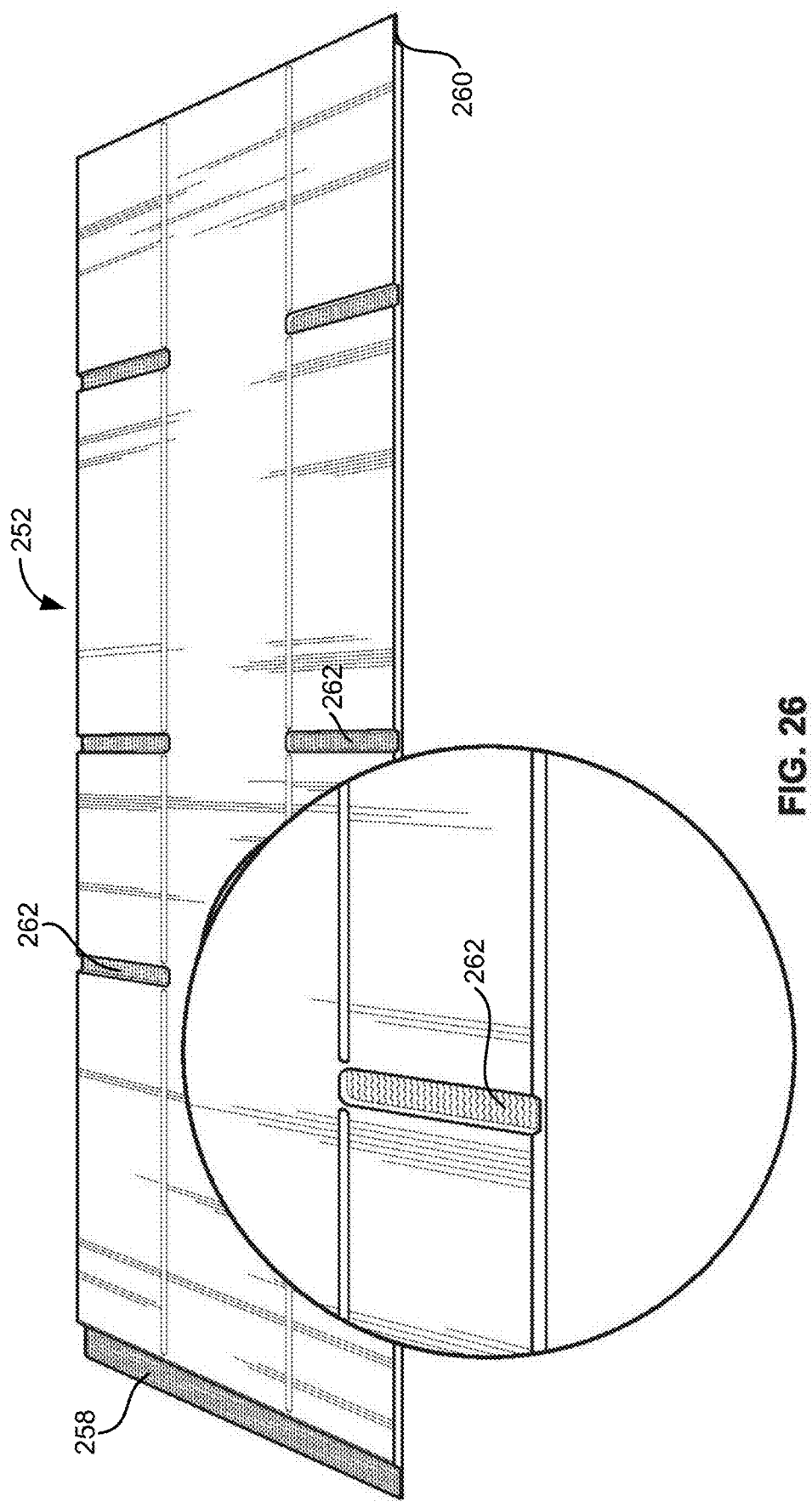
FIG. 26 is a perspective view (with an enlarged section) of a blank having a plurality of pre-sealed segments formed by the anvil of FIG. 24.
Figure 27:
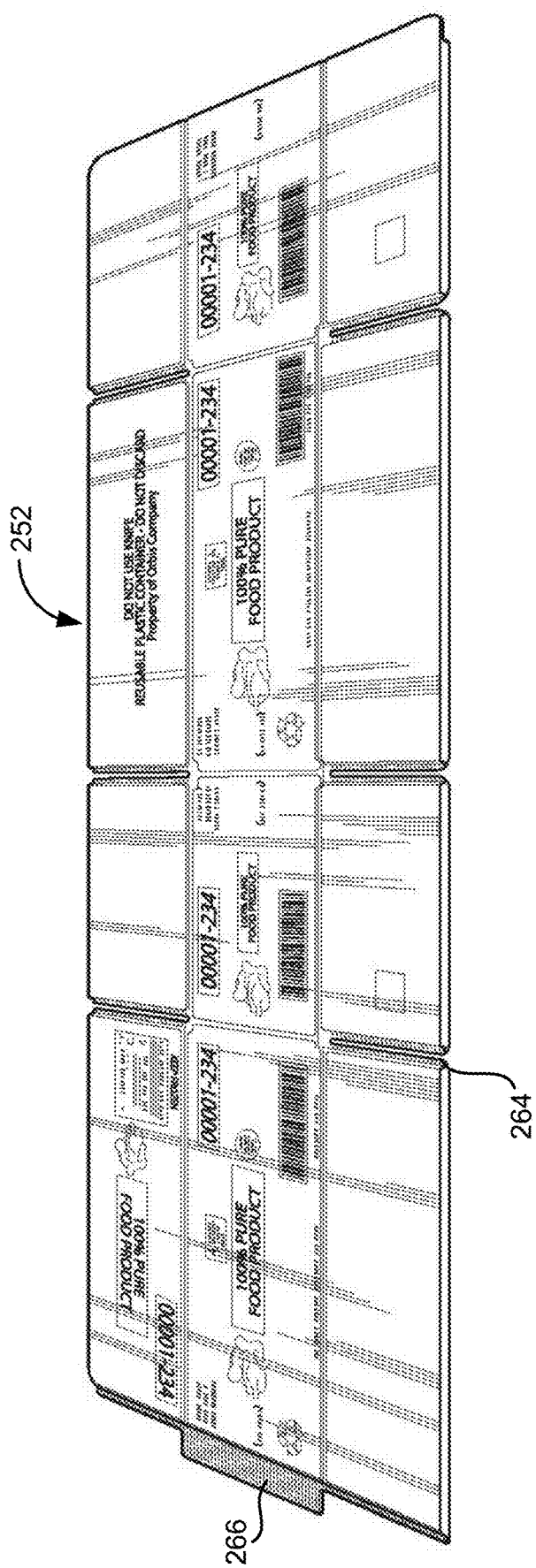
FIG. 27 is a perspective view of a blank having a plurality of pre-sealed segments formed by the anvil of FIG. 24 with a plurality of flap slots cut in the pre-sealed segments.

FIGS. 24 and 25 show a rotary ultrasonic anvil 250 in the form of a roller for use in pre-sealing portions of a corrugated plastic blank 252 (the blank 252 is shown in FIGS. 26-27). The anvil 250 includes an outer contacting surface 254 having an undulating, ridged pattern. The anvil 250 is utilized to contact the top or bottom surface of the blank 252 (depending on the area being pre-sealed) during a pre-sealing operation (in contrast, a smooth anvil and horn were utilized for the embodiment of FIGS. 2-10). The anvil 250 cooperatively works with a rotary ultrasonic horn (identical or similar to the horn 304 used for forming the scorelines 138), which is also in the shape of a roller. The horn typically has a smooth outer surface (although in some embodiments, both the horn and the anvil can include a contacting surface having some structure or pattern). The horn is aligned or registered with the anvil 250 and contacts an opposing side of the blank 254. Again, while the horn typically provides the ultrasonic energy, either of the horn or anvil 250 can be configured to provide the necessary ultrasonic energy to accomplish the task. As shown, the contacting surface 254 of the anvil 250 has slightly rounded corners 256. This eliminates a sharp edge that could damage the plastic corrugated material during pre-sealing.

The horn and anvil 250 contact the blank 252 on the ends 258, 260 of the blank 252 for (later) formation of a glue tab and pre-sealed fourth side panel area, and at the slot locations to form pre-sealed segments 262. The horn and anvil 252 are each mounted on a camming mechanism which separates and brings them together at the proper locations on the blank 252 (more than one horn/anvil combination can be used in the forming apparatus).

As illustrated in FIG. 26, the pre-sealed areas 258 and 262 are shown having an undulating ridged pattern from contacting the anvil 252 (the horn and anvil 250 are reversed for pre-sealing the end 260—thus the lower surface will have the undulating ridged pattern in that area). The excess molten plastic formed from pre-sealing the corrugated plastic is directed by the pattern 254 on the anvil 250 and forms the ridges of the pattern on the surface of the blank 252. As shown in FIG. 27, a portion of this pattern may remain after cutting the slots 264 and glue tab 266.

Figure 30:
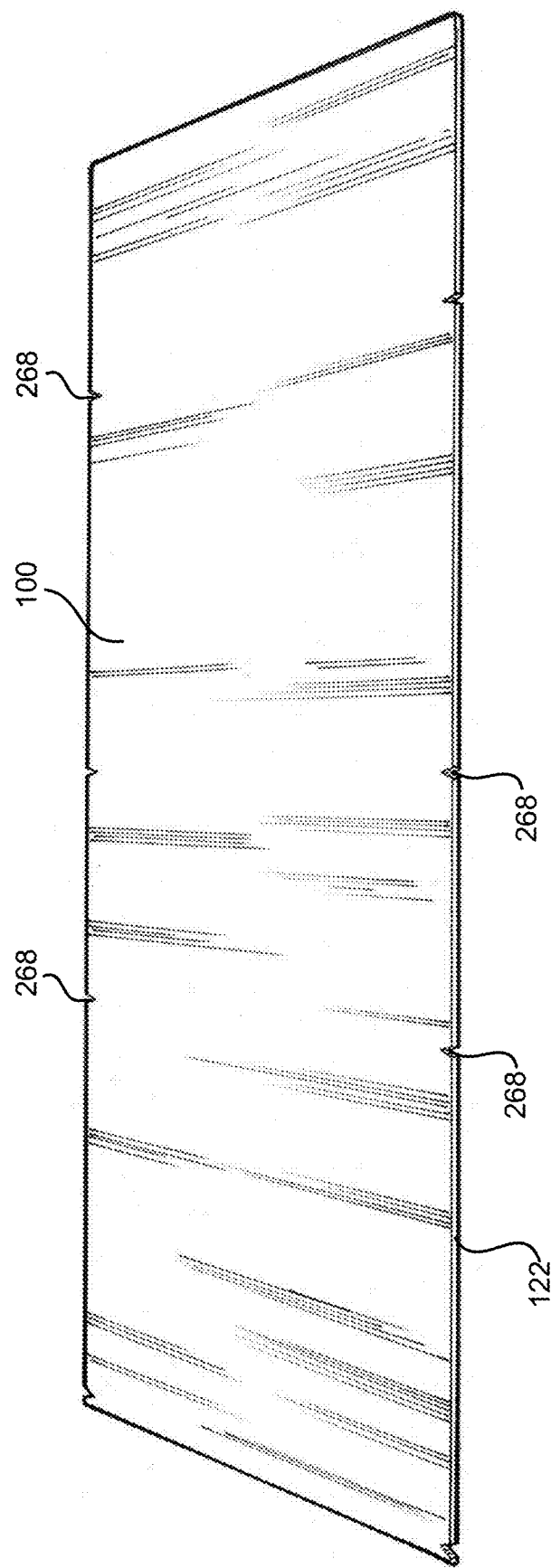
FIG. 30 is a perspective view of a blank with a plurality of air escape holes positioned at locations for pre-sealing.
Figure 31:
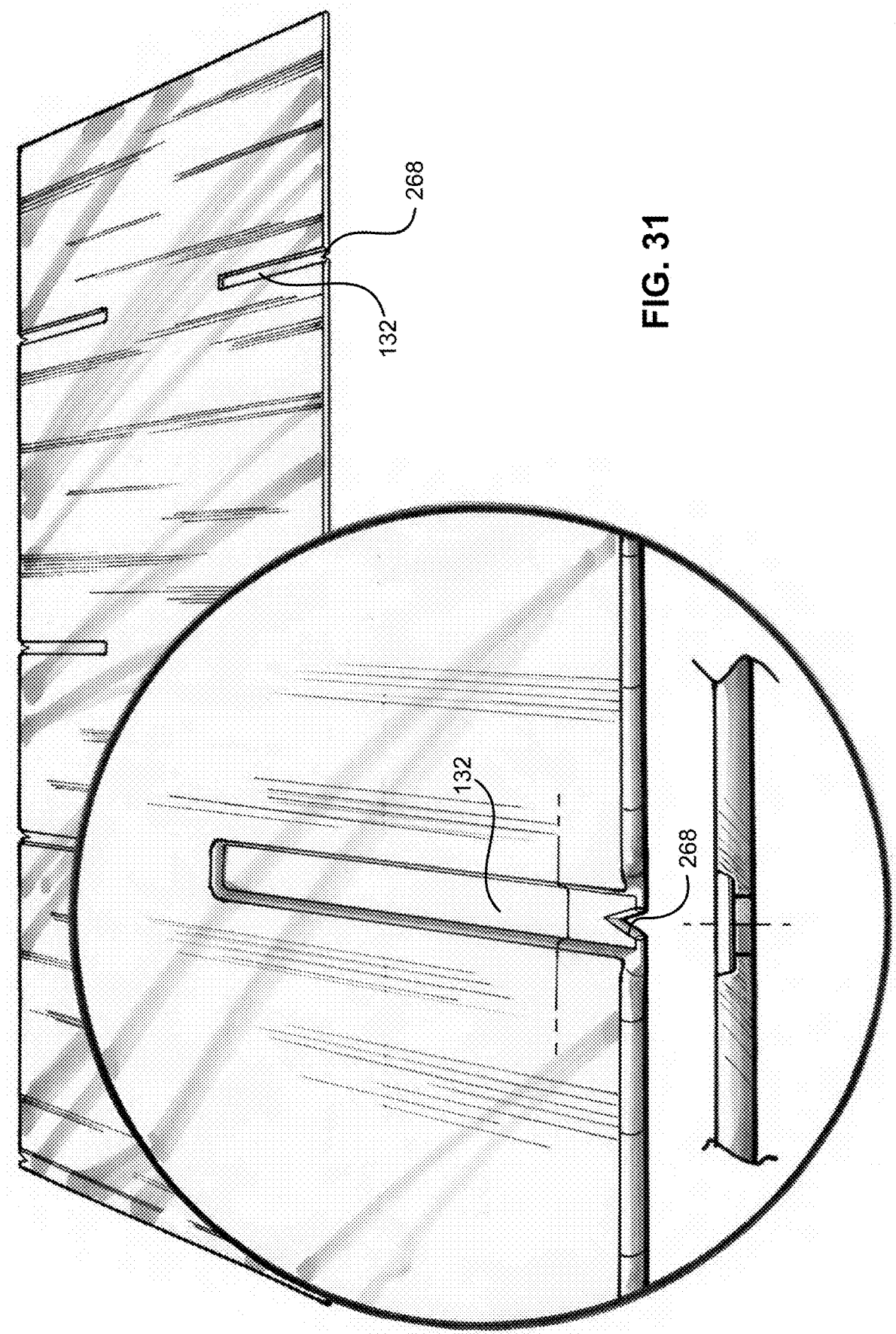
FIG. 31 is a perspective view of a blank with a plurality of escape holes and a plurality of pre-sealed segments (with an enlarged portion)

FIGS. 30 and 31 illustrate use of an air escape hole during the formation process. A plurality of V-shaped cut outs 268 are made to the smooth sealed edges of the blank 100 at locations that are to be pre-sealed as shown in FIG. 30. These cut-outs are also called "bird-bites" because of their V-shape. Making these cut outs 268 in the sealed edge allows air in the pre-sealed areas (e.g., 132) an escape path when the area is being crushed or flattened. Each cut out 268 goes all the way through the flutes that are being crushed. A flattened V-shaped cut 268 remains after the pre-sealing operation as shown in FIG. 31. While the cut outs 268 are shown as V-shaped, other shapes (e.g., an arcuate shape) can be used.

The cut outs 268 also help provide a place for molten plastic to go (in addition to or possibly in place of the ridged ultrasonic device described above) during the pre-sealing process. Without the cut outs 268, molten plastic will often squeeze out and migrate past the plane of the smooth edge seal during the crushing process. The cut out 268 is positioned in the area of the pre-seal 132 that is later cut away to form the slot 142. Accordingly, it does not appear in the completed box.

While FIGS. 30 and 31 show the pre-sealed area 132 having a smooth upper surface, these areas can also be formed using the ridged anvil 250 as discussed above. In this embodiment, the upper surface will have the undulating ridges (or other pattern) shown in FIG. 24, along with the V-shaped cut out 268.

In a typical pre-sealing operation, the blank 100 or 252 has a thickness of 0.140 inches. To form the pre-sealed areas the horn and anvil are spaced a distance of 0.013 inches apart. After the pre-sealed areas pass through the horn and anvil, they are flattened to a thickness of 0.052 inches.

Figure 36:
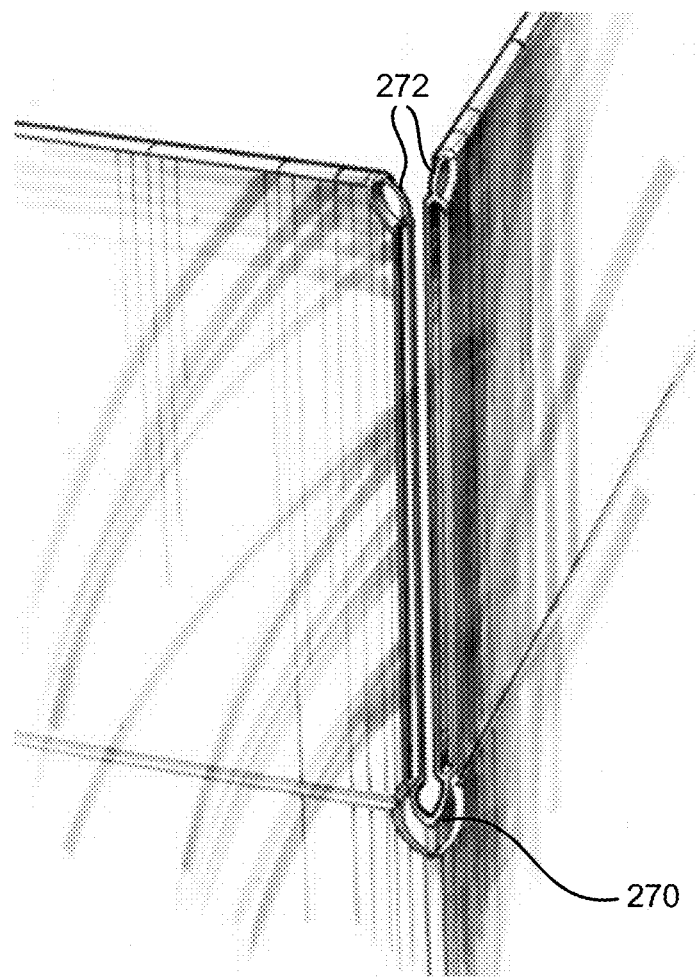
FIG. 36 is a perspective view of a corner of a plastic corrugated container with a first sealed portion and a second sealed portion; and, FIG. 37 is a perspective view of a paper corrugated blank with a "window frame" of trim material.

In accordance with another embodiment, only a minimal amount of sealing is done in the slot area. Because the slot is cut in the direction of the flutes 106, an existing natural barrier is provided along the sides of the slot. That is, the adjacent flute, or next flute over, provides a wall along the length of the slot that prevents contaminants from collecting or entering the area between the outer sheets of the corrugated plastic material. The only areas that require sealing are the very end of the slot (which will have open flutes) and (possibly) the top of the slot near the smooth sealed edge. FIG. 36 shows a flap slot that has a small sealed portion 270 at the end of the slot, and small sealed portions 272 on the corner of each flap defining the top of the slot. The bottom and top sealed portions 270, 272 can be sealed using heat and pressure or ultrasonic sealing. This approach is possibly lower in capital investment than the other approaches discussed herein.

Figure 35:
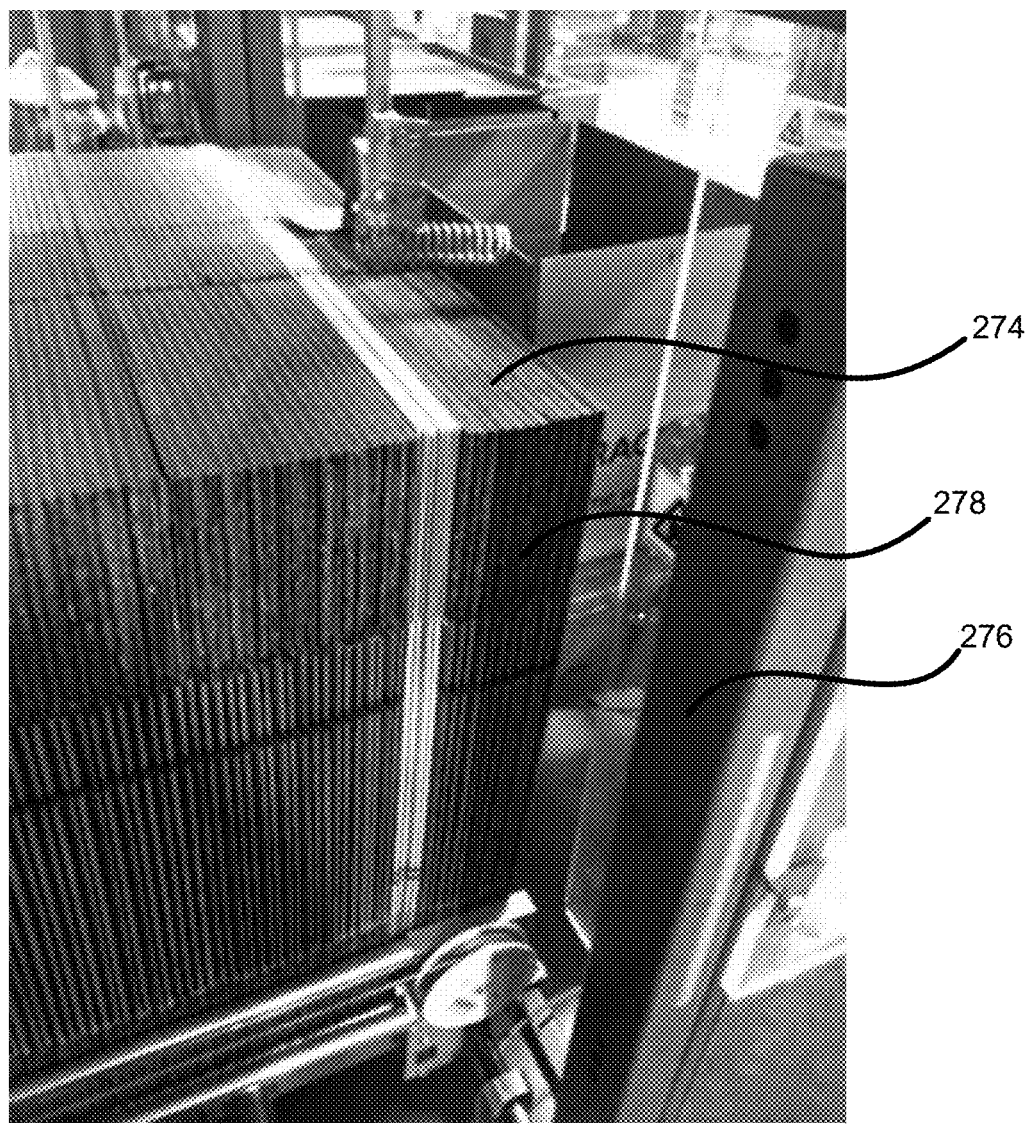
FIG. 35 is a perspective view of a plurality of corrugated paper blanks and a plurality of corrugated plastic blanks in a box converting apparatus.

FIG. 35 shows a plurality of plastic corrugated blanks 274 (formed in accordance with the present invention) in a box converting apparatus 276. The plastic corrugated blanks 274 are intermingled with paper corrugated blanks 278.

Figure 37:
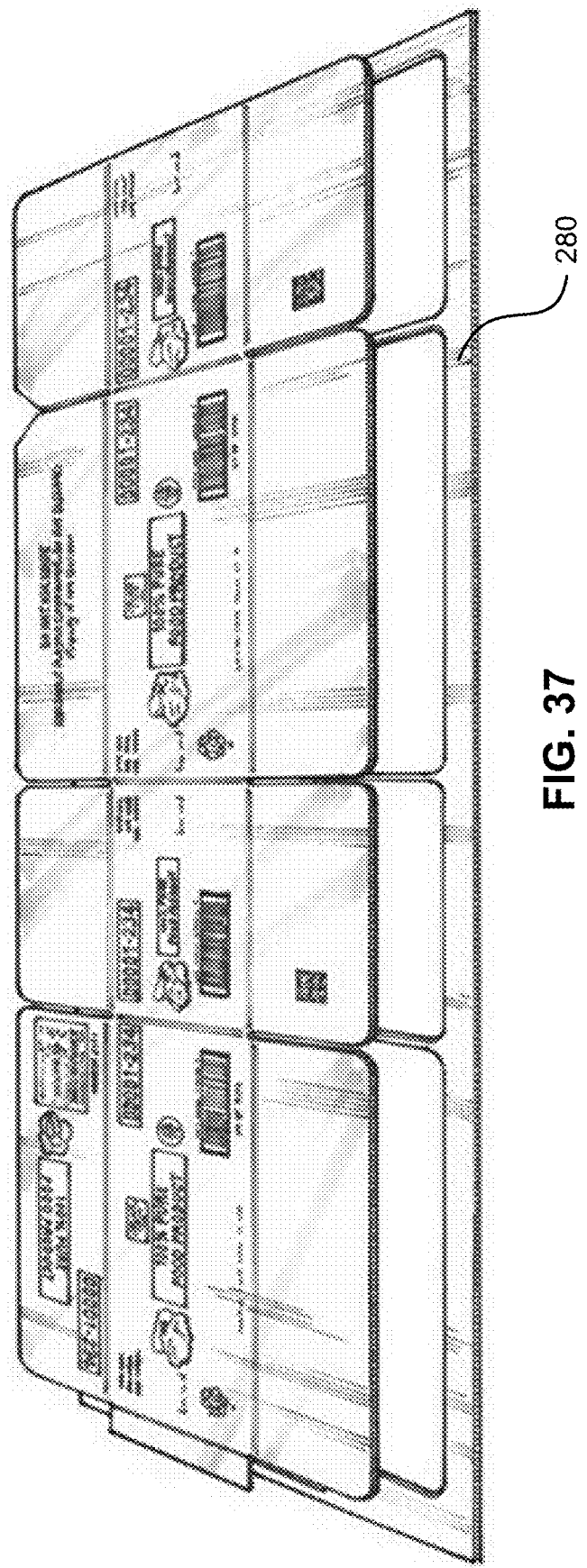

Prior to the present invention, when die cutting paper or plastic corrugated boxes, the conventional process used a blank that is slightly larger than the (eventual) die cut box. The die cut process would cut out the entire perimeter of the box (and all cut out portions), leaving a "window frame" of trim material 280 around the perimeter as shown in FIG. 37. When die cutting using rotary or flatbed die cut equipment, the window frame 280 is used to pull the blanks through the equipment and is then stripped away. In the present invention, the top and bottom edges of the blank are not cut away and instead are provided a smooth seal. Thus, the present process does not have the wasted "window frame" material.

While the term "horn" is typically used to describe the part of the system that emits the ultrasonic energy, it is understood that in any of the embodiments that ultrasonically reshape and/or weld the corrugated plastic material, either the horn or the anvil can emit the ultrasonic energy.

While the specific embodiments have been illustrated and described, numerous modifications come to mind without significantly departing from the spirit of the invention, and the scope of protection is only limited by the scope of the accompanying Claims.

What is claimed is:

1. A process for forming a plastic corrugated box having a plurality of wall panels comprising:
   providing a rectangular sheet of plastic corrugated material having a first outer layer, and a second outer layer spaced from the first outer layer by a plurality of flutes extending in a first direction between the first and second outer layers, wherein the plurality of flutes are perpendicular to the first outer layer and the second outer layer, the rectangular sheet having a first outer edge along a first side of the sheet and an opposing second outer edge along a second side of the sheet and a first thickness from an outer surface of the first outer layer to an outer surface of the second outer layer;
   forming a plurality of fold lines in the sheet defining a plurality of side wall panels;
   forming a plurality of score lines in the sheet defining a plurality of flaps extending from the side wall panels; and,
   initially forming a plurality flattened segments in the sheet by ultrasonically welding the first outer layer, flutes and the second outer layer at each segment at positions aligned with the fold lines for forming a plurality of slots between the flaps, before a slot cutting step; wherein each of the plurality of segments extends from one of the first edge and second edge of the sheet and wherein each of the flattened segments have a second thickness from the outer surface of the first outer layer to the outer surface of the second outer layer where the second thickness is less than the first thickness.

2. The process of claim 1 further comprising the step of:
   forming at least a first portion of a first end of the sheet by welding the first outer layer to the second outer layer at the first portion of the first end of the sheet and at least a first portion of a second end of the sheet by welding the first outer layer to the second outer layer at the first portion of the second end for formation of a manufacturer's joint.

3. The process of claim 2 further comprising the step of:
   cutting a second portion of the first end of the sheet to form a centrally located glue tab.

4. The process of claim 1 further comprising the steps of:
   forming a smooth sealed top edge of the sheet; and,
   forming a smooth sealed bottom edge of the sheet.

5. The process of claim 4 further comprising the step of:
   cutting slots, subsequent to initially forming flattened segments, within a central portion of each of the plurality of flattened segments having a width less than a width of the flattened segments.

6. The process of claim 5 wherein the step of cutting slots within the plurality of flattened segments comprises:
   placing the sheet in a die cutting apparatus; and,
   die cutting the slots.

7. The process of claim 1 wherein the step of forming a plurality of flattened segments on the sheet by welding the first outer layer to the second outer layer at each segment at positions for forming a plurality of slots between the flaps comprises the step of:
   applying heat and pressure to the sheet at the segment positions.

8. The process of claim 1 wherein the step of forming a plurality of flattened segments on the sheet by welding the first outer layer to the second outer layer at each segment at positions for forming a plurality of slots between the flaps comprises the step of:
   ultrasonically welding the sheet at the segment positions.

9. The process of claim 8 wherein the step of ultrasonically welding the sheet at the segment positions comprises the step of:
   contacting an anvil of a rotary ultrasonic device on a first outer surface of the sheet at the segment positions.

10. The process of claim 9 wherein the step of ultrasonically welding the sheet at the segment positions comprises the step of:
    contacting a horn of the rotary ultrasonic device on a second outer surface of the sheet, the horn being aligned with the anvil.

11. The process of claim 9 wherein the step of contacting a rotary horn of an ultrasonic device on a first outer surface of the sheet at the segment positions comprises the step of:
    directing excess plastic of the sheet formed when forming the flattened segments.

12. The process of claim 9 wherein the step of directing excess plastic of the sheet formed when forming the segments comprises the step of:
    providing the anvil with a contacting surface having peaks and valleys wherein the valleys provide a location for the excess plastic to move to during the forming step.

13. The process of claim 12 wherein the step of providing the anvil with a contacting surface having peaks and valleys comprises the step of:
    providing an undulating wave pattern of ridges on the contacting surface of the anvil.

14. The process of claim 1 further comprising the step of:
    forming air escape holes in the sheet proximate the segment positions.

15. The process of claim 1 wherein the first thickness is 0.140 inches and the second thickness is 0.052 inches.

16. A process for forming a plastic corrugated box comprising:
    providing a generally rectangular sheet of plastic corrugated material having a first outer layer, and a second outer layer spaced from the first outer layer by a plurality of flutes extending in a first direction between the first and second outer layers, the rectangular sheet having a first outer edge along a first side of the sheet and an opposing second outer edge along a second side of the sheet and a first thickness between an outer surface of the first outer layer and an outer surface of the second outer layer;

forming a plurality of fold lines in the sheet in the first direction defining a plurality of side panels of the box;

forming a plurality of score lines in the sheet in a second direction substantially perpendicular to the first direction defining a plurality of flaps extending from the side panels; and, initially forming a plurality of flattened segments in the sheet by welding the first outer layer, flutes and the second outer layer at each segment at positions aligned with the fold lines for forming a plurality of slots between the flaps; wherein each of the plurality of segments extends from one of the first edge and second edge of the sheet and wherein each of the flattened segments have a second thickness from the outer surface of the first outer layer to the outer surface of the second outer layer where the second thickness is less than the first thickness;

subsequent to forming the plurality of flattened segments, cutting a slot in a central portion of each of the plurality of flattened segments.

17. The process of claim 16 further comprising the step of:
    forming air escape holes in the sheet proximate the segment positions.

18. The process of claim 16 further comprising the step of:
    cutting slots in the pre-sealed segments.

19. The process of claim 16 wherein the step of forming a plurality of flattened segments comprises the step of:
    contacting the first outer layer of the sheet with an ultrasonic device having a contacting surface with a plurality of ridges.

20. The process of claim 19 wherein the contacting the first outer layer of the sheet with an ultrasonic devise comprises the step of:
    rolling an anvil of the ultrasonic device on the first outer layer, the anvil having an undulating ridge pattern on the contacting surface.

21. The process of claim 16 wherein the first thickness is 0.140 inches and the second thickness is 0.052 inches.

* * * * *